United States Patent
Hayashida et al.

(10) Patent No.: US 9,072,971 B2
(45) Date of Patent: Jul. 7, 2015

(54) COMPUTER READABLE MEDIUM STORING INFORMATION PROCESSING PROGRAM OF GENERATING A STEREOSCOPIC IMAGE

(75) Inventors: Koichi Hayashida, Kyoto (JP); Hideyuki Sugawara, Kyoto (JP); Kenta Motokura, Kyoto (JP); Kiyoshi Takeuchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 434 days.

(21) Appl. No.: 13/270,504

(22) Filed: Oct. 11, 2011

(65) Prior Publication Data

US 2012/0306857 A1 Dec. 6, 2012

(30) Foreign Application Priority Data

Jun. 3, 2011 (JP) .................... 2011-125187

(51) Int. Cl.
- *G06T 15/00* (2011.01)
- *A63F 13/40* (2014.01)
- *H04N 13/00* (2006.01)
- *H04N 13/02* (2006.01)
- *H04N 13/04* (2006.01)

(52) U.S. Cl.
CPC ............ *A63F 13/10* (2013.01); *H04N 13/0022* (2013.01); *H04N 13/0239* (2013.01); *H04N 13/0275* (2013.01); *H04N 13/0402* (2013.01); *A63F 2300/204* (2013.01); *A63F 2300/30* (2013.01); *A63F 2300/6669* (2013.01)

(58) Field of Classification Search
CPC ............ A63F 13/10; A63F 2300/6669; A63F 2300/204; A63F 2300/30; H04N 13/0022; H04N 13/0239; H04N 13/0402; H04N 13/0275

USPC .......... 348/43, 46, 47, 51; 345/419, 420, 632, 345/633; 382/154; 715/757
See application file for complete search history.

(56) References Cited

U.S. PATENT DOCUMENTS

| | | | |
|---|---|---|---|
| 2003/0179198 A1* | 9/2003 | Uchiyama | 345/427 |
| 2005/0089212 A1 | 4/2005 | Mashitani et al. | |
| 2006/0158730 A1* | 7/2006 | Kira | 359/462 |
| 2006/0232584 A1* | 10/2006 | Utsugi et al. | 345/426 |
| 2007/0273761 A1* | 11/2007 | Maruyama et al. | 348/51 |
| 2008/0024523 A1* | 1/2008 | Tomite et al. | 345/632 |
| 2011/0090217 A1 | 4/2011 | Mashitani et al. | |
| 2011/0102427 A1 | 5/2011 | Mashitani et al. | |
| 2011/0102428 A1 | 5/2011 | Mashitani et al. | |
| 2011/0103680 A1 | 5/2011 | Mashitani et al. | |

(Continued)

FOREIGN PATENT DOCUMENTS

| | | |
|---|---|---|
| JP | 2003-107603 | 4/2003 |
| JP | 2004-007396 A | 1/2004 |

OTHER PUBLICATIONS

Itami et al. JP 2003-107603 Translated Full Text and Abstract. Apr. 2003.*

*Primary Examiner* — Christopher S Kelley
*Assistant Examiner* — Zhihan Zhou
(74) *Attorney, Agent, or Firm* — Nixon & Vanderhye P.C.

(57) ABSTRACT

One embodiment of a present invention causes a computer to execute controlling a position of an object in the virtual space, determining an area where the object is positioned from among a plurality of areas set in the virtual space, setting a stereoscopic parameter which is used for rendering a stereoscopic image according to the determined area, generating a stereoscopic image including the object based on the set stereoscopic parameter, and displaying the generated stereoscopic image on the display device.

14 Claims, 18 Drawing Sheets

(56) References Cited

U.S. PATENT DOCUMENTS

| | | |
|---|---|---|
| 2011/0157173 A1 | 6/2011 | Mashitani et al. |
| 2011/0157174 A1 | 6/2011 | Mashitani et al. |
| 2011/0157319 A1 | 6/2011 | Mashitani et al. |
| 2011/0193861 A1 | 8/2011 | Mashitani et al. |
| 2011/0249090 A1* | 10/2011 | Moore et al. .......... 348/43 |
| 2012/0044249 A1 | 2/2012 | Mashitani et al. |

* cited by examiner

COMPUTER READABLE MEDIUM STORING INFORMATION PROCESSING PROGRAM OF GENERATING A STEREOSCOPIC IMAGE

CROSS-REFERENCE TO RELATED APPLICATIONS

This application is based upon and claims the benefit of priority of the prior Japanese Patent Application No. JP2011-125187, filed on Jun. 3, 2011, the entire contents of which are incorporated herein by reference.

FIELD

The present invention relates to an information processing program, an information processing device, an information processing system, and an information processing method.

BACKGROUND

Conventionally, known is technology concerning stereoscopic viewing as a method of obtaining a three-dimensional visual sensation by using parallax. In recent years, representation based on this kind of stereoscopic viewing is being used in various fields. For example, by using representations based on stereoscopic viewing, games and CG (Computer Graphics) animation and the like which stereoscopically display a three-dimensional virtual space are being developed.

When stereoscopically displaying a three-dimensional virtual space, for example, images obtained from two virtual cameras set within the three-dimensional virtual space are used. In order to realize stereoscopic viewing with a high visual effect, the foregoing two virtual cameras need to be set appropriately. For example, known is a setting method of virtual cameras for deciding the gaze position so as to focus attention at the portion to be observed (refer to Japanese Patent Application Laid-open No. 2003-107603).

With the technology of conventional stereoscopic viewing, when generating an image for stereoscopic viewing (hereinafter also referred to as the "stereoscopic image"), for example, the gaze position is decided to be a specific object in the virtual space. Thus, with the technology of conventional stereoscopic viewing, attention was focused only on a specific object, and it was difficult to enable the user to appropriately comprehend the virtual space that is represented by stereoscopic images.

SUMMARY

One embodiment of the present invention is non-transitory computer-readable medium storing an information processing program to be executed by a computer of an information processing device which displays a predetermined virtual space on a display device capable of stereoscopic display, the information processing program causing the computer to execute controlling a position of an object in the virtual space, determining an area where the object is positioned from among a plurality of areas set in the virtual space, setting a stereoscopic parameter which is used for rendering a stereoscopic image according to the determined area, generating a stereoscopic image including the object based on the set stereoscopic parameter, and displaying the generated stereoscopic image on the display device.

According to the embodiment, a stereoscopic image is generated based on the stereoscopic parameter that is set according to the area where the object is positioned. Thus, since it is possible to generate a stereoscopic image according to the area where the object is positioned, according to the present invention, it is possible to enable the user to more appropriately comprehend the virtual space that is represented with the stereoscopic image.

Moreover, as another mode of the embodiment of the present invention, the information processing program may further cause the computer to execute receiving an input from an input device, and the position of the object may be controlled based on the received input in the controlling the position of the object.

According to the embodiment, it is possible to control the position of the object based on the input from the input device.

Moreover, as another mode of the embodiment of the present invention, a shape that is set as a shape of the plurality of areas may be provided with a plurality of types of shapes.

Moreover, as another mode of the present invention, the plurality of types of shapes may be three-dimensional shapes including at least a cuboid, a circular cylinder or a sphere.

According to the embodiment, an area of a three-dimensional shape including at least a cuboid, a circular cylinder or a sphere can be set in the virtual space.

Moreover, as another mode of the embodiment of the present invention, a priority may be set to each of the plurality of areas set in the virtual space, and, when determining that the object is simultaneously positioned in a plurality of areas in the determining the area, the stereoscopic parameter may be set according to an area from among the plurality of areas where the object is positioned according to the priority in the setting the stereoscopic parameter.

According to the embodiment, when the object is simultaneously positioned in a plurality of areas, the area for which the stereoscopic parameter should be set is selected according to the priority that is set in the respective areas. Thus, the area can be set in the virtual space without having to give consideration to the level of overlapping of the areas. Thus, according to the present invention, it is possible to more easily set the area in the virtual space.

Moreover, as another mode of the embodiment of the present invention, the stereoscopic parameter may include at least a parameter concerning a reference plane which prescribes in the virtual space a position where parallax does not occur or a parameter concerning a sense of depth of the stereoscopic image.

Moreover, as another mode of the embodiment of the present invention, when a setting value to be set to as the stereoscopic parameter according to the determined area is different from a current value that is already set in the stereoscopic parameter, the stereoscopic parameter may be set so that a value that is set in the stereoscopic parameter gradually changes from the current value to the setting value in the setting the stereoscopic parameter.

According to the embodiment, when the value to be set in the stereoscopic parameter is switched, the stereoscopic parameter is set so that the value to be set in the stereoscopic parameter is gradually changed. Consequently, the value to be set in the stereoscopic parameter to be used for the rendering of the stereoscopic image will change gradually with the lapse of time. Thus, according to the present invention, it is possible to prevent the abrupt change of the stereoscopic image that is rendered based on the stereoscopic parameter.

Moreover, as another mode of the embodiment of the present invention, the stereoscopic parameter may be set such that the value that is set in the stereoscopic parameter gradually changes from the current value to the setting value after the lapse of an initial predetermined period of the change in the setting the stereoscopic parameter.

According to the embodiment, the stereoscopic parameter is set so that the value that is set in the stereoscopic parameter is gradually changed from the current value to the setting value after the lapse of a predetermined period. In other words, the value that is set in the stereoscopic parameter is switched after the lapse of a predetermined period. Thus, it is possible to prevent the frequent and abrupt change of the stereoscopic image that is rendered based on the stereoscopic parameter that may occur when the value that is set in the stereoscopic parameter is switched frequently.

Moreover, as another mode of the embodiment of the present invention, the stereoscopic parameter may be set so that a variation pertaining to the change from the current value to the setting value becomes constant in the setting the stereoscopic parameter.

Moreover, as another mode of the embodiment of the present invention, the stereoscopic parameter may be set so that the variation pertaining to the change from the current value to the setting value decreases in the setting the stereoscopic parameter.

Moreover, as another mode of the embodiment of the present invention, the stereoscopic parameter may be set so that the variation pertaining to the change from the current value to the setting value increases in the setting the stereoscopic parameter.

According to the embodiment, the stereoscopic parameter is set so that the variation pertaining to the change from the current value to the setting value increases. In other words, when the value that is set in the stereoscopic parameter is switched, the variation in the value that is set in the stereoscopic parameter is smaller in the initial stage of the change in the gradual change of the value that is set in the stereoscopic parameter. Thus, it is possible to prevent the frequent and abrupt change of the stereoscopic image that is rendered based on the stereoscopic parameter that may occur when the value that is set in the stereoscopic parameter is switched frequently.

Moreover, as another mode of the embodiment of the present invention, the period of change from the current value to the setting value may be prescribed according to the determined area.

Note that the non-transitory computer-readable medium can be read by a computer or other devices and machines. Here, the non-transitory computer-readable medium that can be read by computer and the like is a medium that accumulates information such as programs based on electrical, magnetic, optical, mechanical or chemical operation.

Note that the present invention may be an information processing device, an information processing system, or an information processing method. Here, the information processing device of this invention can also be realized by a plurality of computers or the like that can be configured communicably.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment according to one aspect of the present invention (hereinafter also referred to as "this embodiment") is now explained with reference to the drawings. However, this embodiment explained below is merely an illustration of this invention in all respects, and does not intend to limit the range thereof. It goes without saying that the present invention can be variously improved and modified without deviating from the scope thereof. In other words, upon implementing the present invention, specific configurations according to this embodiment can be adopted as needed. Moreover, this embodiment explained below shows an example of applying the present invention to a computer-readable medium storing a game program. Nevertheless, the target of application of the present invention is not limited to the computer-readable medium storing the game program.

Note that the data described in this embodiment is explained using natural language (English or the like). Nevertheless, the foregoing data is specifically designated by pseudo-language, commands, parameters, machine language and the like which are recognizable by a computer.

§1 Device Configuration

[Processing Example]

Figure 1A:
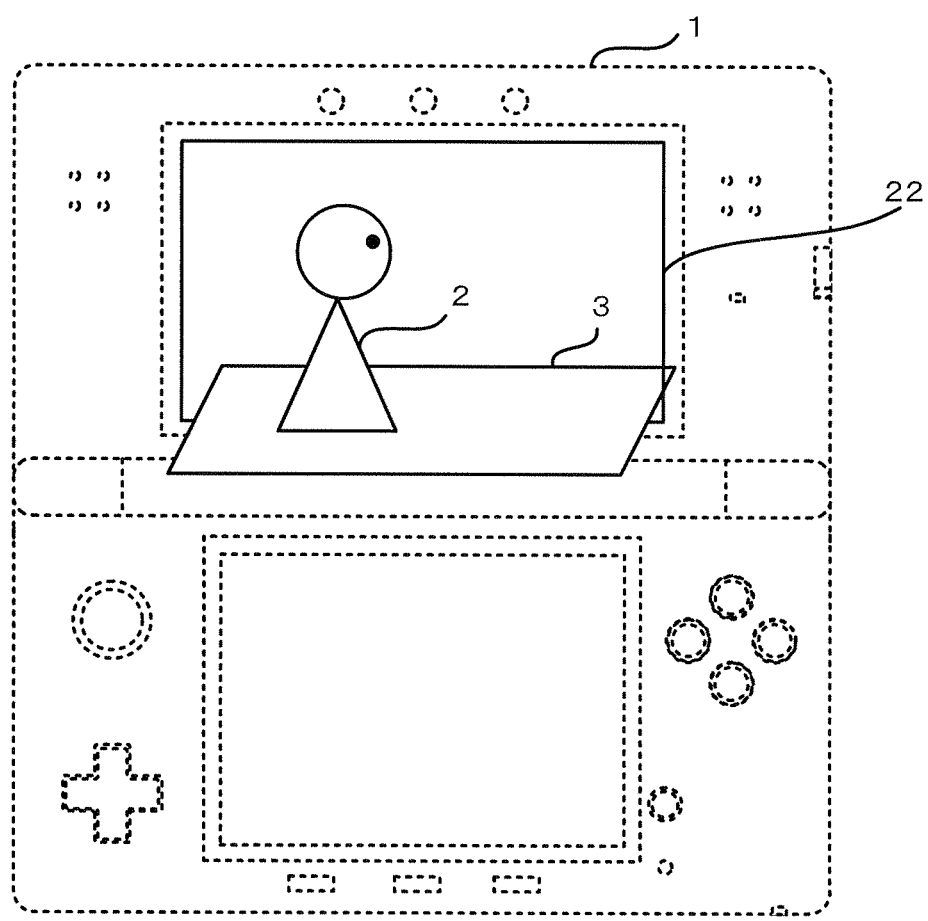
FIG. 1A is a diagram illustrating the screen image of the game device according to an embodiment of this invention.
Figure 1B:
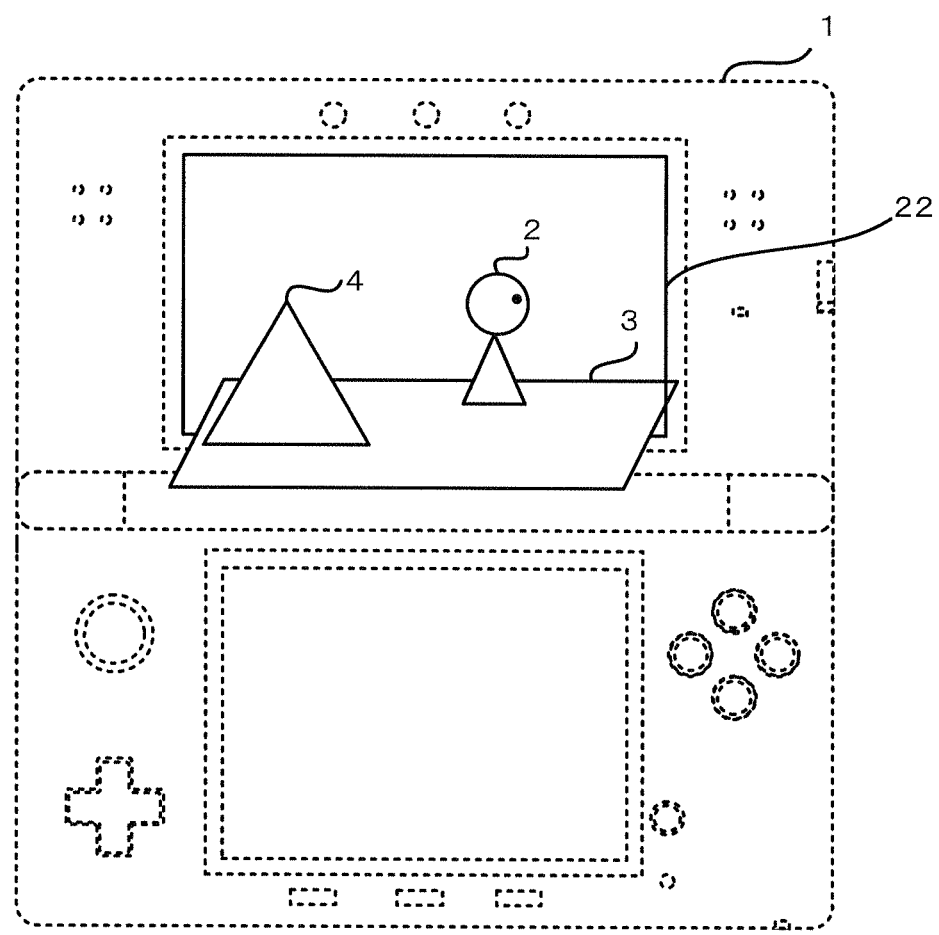
FIG. 1B is a diagram illustrating the screen image of the game device according to an embodiment of this invention.

FIGS. 1A and 1B illustrate the screen image of the game device 1 according to this embodiment. The game device 1 according to this embodiment provides a so-called action game to a player as shown in FIGS. 1A and 1B. With the action game provided by the game device 1, objects such as a character 2 and an obstacle 4 as well as a field 3 exist in a three-dimensional virtual space (the three-dimensional virtual space is also referred to as the "game space" in this embodiment).

The character 2 is a player object that moves within the game space based on input operations and the like by the player. The field 3 is an object showing the landscape and the like which are set in the game space. The objects showing the landscape and the like include, for example, the ground, walls and so on that are set in the game space. The obstacle 4 is an object such as an enemy character or the like that is set in the game space. The game device 1 according to this embodiment provides, to the player, an action game of moving the character 2 from a predetermined start point to a goal point of the field 3 by operating the character 2.

The game device 1 comprises a display 22 (described later as the upper LCD 22). The display 22 can display an image (stereoscopic image) that can be viewed stereoscopically. Thus, as shown in FIGS. 1A and 1B, the player can experience a three-dimensional visual sensation of the game space from the image that is displayed on the display 22. Specifically, with the screen image shown in FIG. 1A, the player can experience a sensation that the character 2 exists three-dimensionally at the position of the display 22. Moreover, with the screen image shown in FIG. 1B, the player can experience a sensation that the obstacle 4 exists three-dimensionally at the position of the display 22, and the character 2 exists three-dimensionally on the back side of the display 22 with the player as the reference.

The game device 1 renders a stereoscopic image including the character 2 and displays this on the display 22. The player can comprehend the status of the game space from the stereoscopic image displayed on the display 22. Here, the method of effectively displaying the stereoscopic image or the rendering procedures for enabling the player to more appropriately comprehend the game space will differ by depending on the status of the game space.

As this kind of method of effectively displaying the stereoscopic image or the rendering procedures, for example, an example of causing the obstacle 4 that is different from the character 2 to appear is examined. In the foregoing case, for example, rather than rendering the stereoscopic image which focuses attention on the character 2, there are cases where the player can more appropriately comprehend the game space by rendering the stereoscopic image which focuses attention on the obstacle 4 as shown in the differences of the screen images shown in FIGS. 1A and 1B. Moreover, for example, when the character 2 is positioned in an area where depth is important, there are cases where the player can more appropriately comprehend the game space by rendering the stereoscopic image with a stronger stereoscopic effect than the other areas.

As described above, depending on the state in the game space where the character 2 is positioned, the method of display and rendering procedures for enabling the player to more appropriately comprehend the game space may differ. Thus, the game device 1 renders the stereoscopic image so that the player can more appropriately comprehend the game space by switching the stereoscopic parameter that is used for the rendering of the stereoscopic image according to the area in the game space where the character 2 is positioned. Specifically, the game device 1 performs the following operations.

Figure 2A:
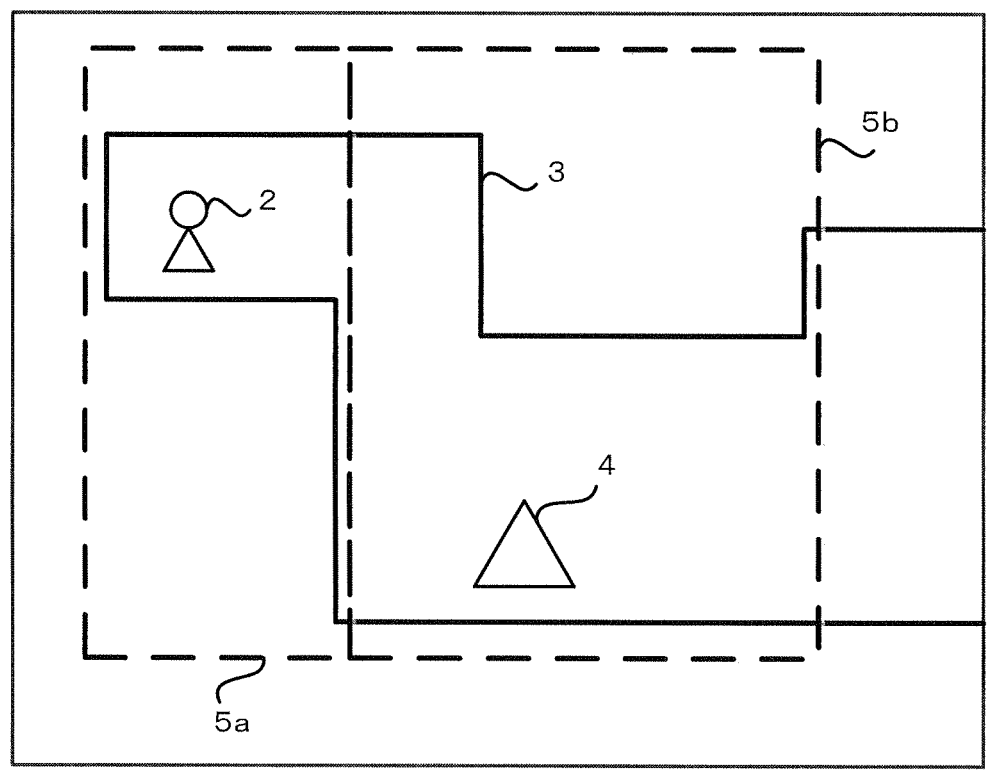
FIG. 2A is an overhead view illustrating the status of the game according to an embodiment of this invention.
Figure 2B:
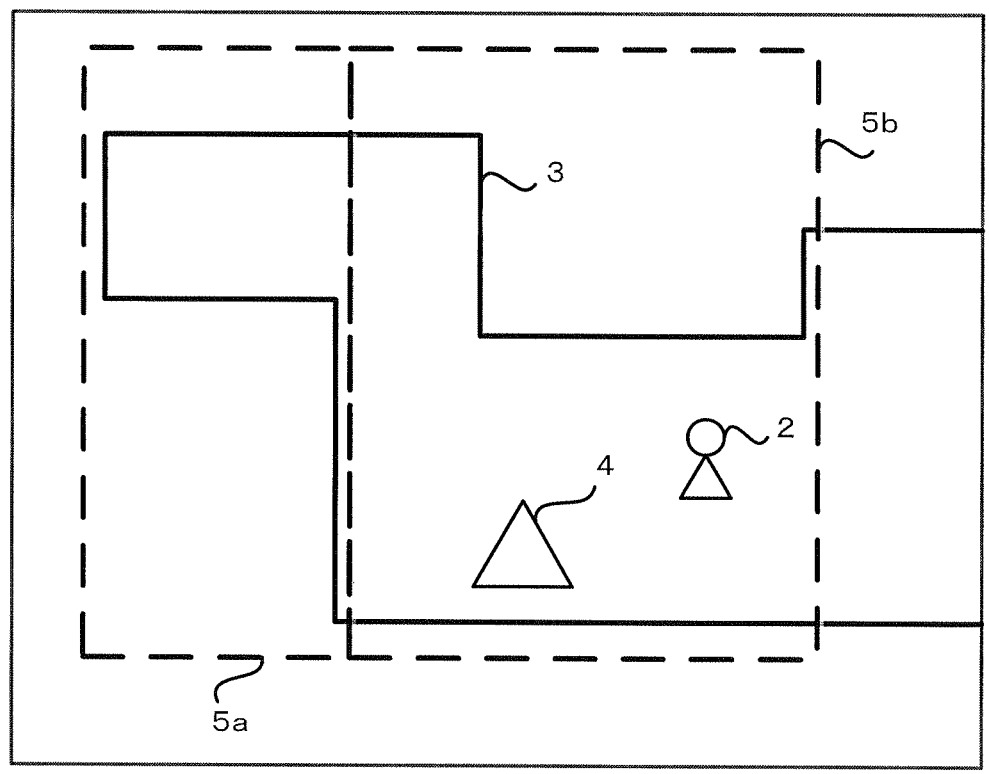
FIG. 2B is an overhead view illustrating the status of the game according to an embodiment of this invention.

FIG. 2A is an overhead view illustrating the status of the game space corresponding to the screen image shown in FIG. 1A. For example, on the assumption that the screen image shown in FIG. 1A is the front view of the game space viewed from the front (player side), FIG. 2A is the plan view that shows the game space from above. Moreover, FIG. 2B is an overhead view illustrating the status of the game corresponding to the screen image shown in FIG. 1B. As shown in FIGS. 2A and 2B, a plurality of areas (5a, 5b) are set in the game space according to this embodiment.

The game device 1 identifies the area where the character 2 is positioned among the plurality of areas that are set in the game space. In the example shown in FIG. 2A, the area where the character 2 is positioned is identified as the area 5a. Moreover, in the example shown in FIG. 2B, the area where the character 2 is positioned is identified as the area 5b.

Here, in the area 5a, an object other than the character 2 does not exist on the field 3. Thus, in the area 5a, let it be assumed that the condition in the vicinity of the character 2 is important to the player. Moreover, in the area 5b, let it be assumed that the status of the obstacle 4 is important to the player. The game device 1 sets the stereoscopic parameter that is used for the rendering of the stereoscopic image according to the identified area in consideration of the foregoing points.

The game device 1 renders the stereoscopic image based on the set stereoscopic parameter. In other words, when the character 2 is positioned in the area 5a, the game device 1 renders the stereoscopic image so that the player can easily comprehend the status of the position in the vicinity of the character 2 (FIG. 1A). Moreover, when the character 2 is positioned in the area 5b, the game device 1 renders the stereoscopic image so that the player can easily comprehend the status of the obstacle 4 (FIG. 1B).

As described above, the game device 1 according to this embodiment identifies the area where the character 2 is positioned, and sets the stereoscopic parameter according to the identified area. In other words, the game device 1 according to this embodiment switches the stereoscopic parameter that is used for the rendering of the stereoscopic image based on the area where the character 2 is positioned. As a result of performing the foregoing operation, the game device 1 according to this embodiment renders the stereoscopic image according to the area where the character is positioned in the game space and the status of that area, and enables the player to more appropriately comprehend the game space.

Note that the game program that is executed by the game device 1 corresponds to the information processing program of this invention. Moreover, the character 2 corresponds to the "object" of this invention.

[Game Device]

Figure 3:
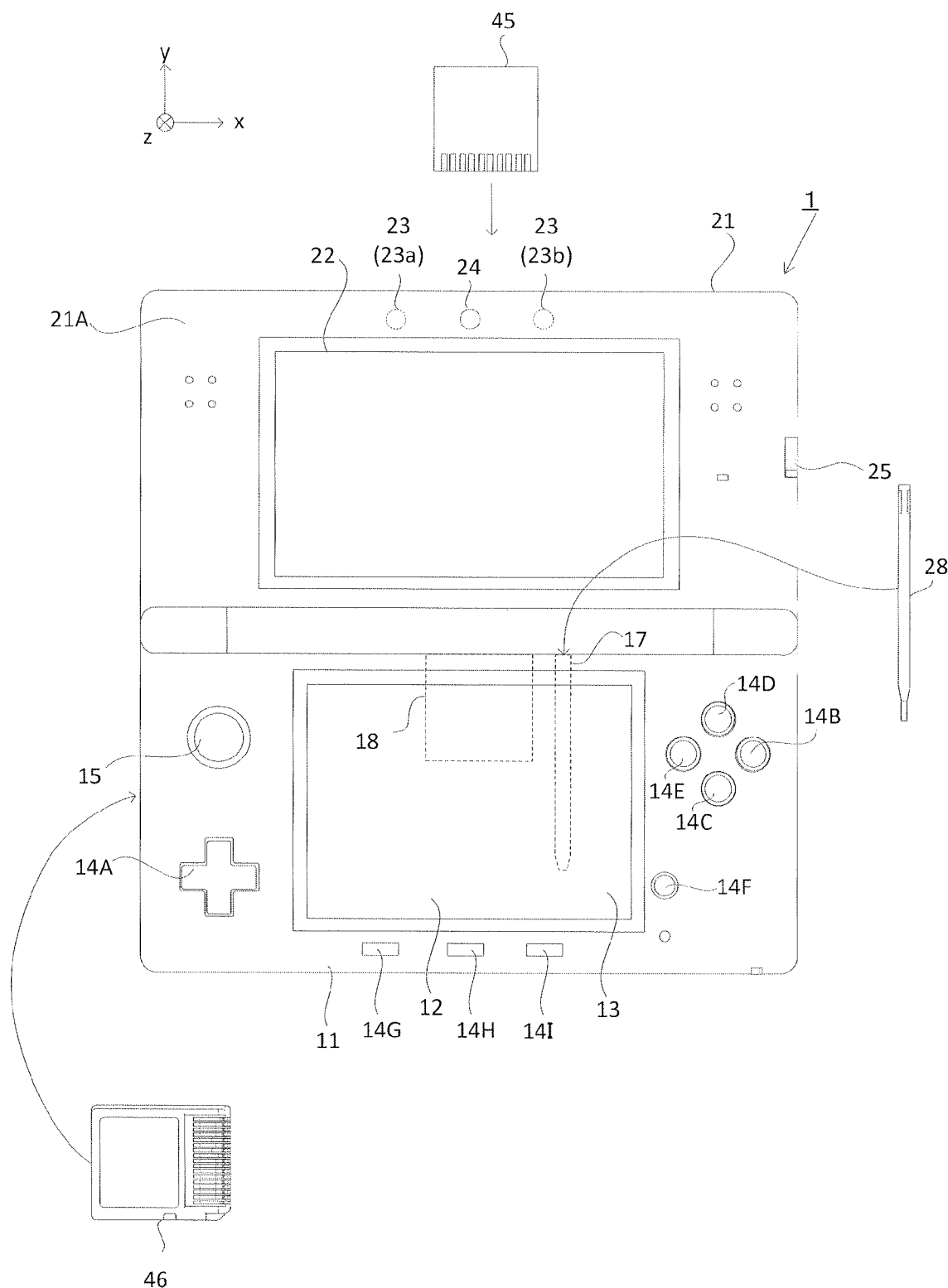
FIG. 3 is a diagram illustrating the external view of the game device according to an embodiment of this invention.

FIG. 3 illustrates the exterior view of the game device 1 according to this embodiment. The game device 1 includes a lower housing 11 and an upper housing 21. The lower housing 11 and the upper housing 21 are connected in an openable and closable manner (foldable manner) by a hinge structure.

The lower housing 11 is provided with a lower LCD (Liquid Crystal Display) 12, a touch panel 13, various operation buttons 14A to 14I, an analog stick 15, an insertion slot 17, and an insertion slot 18.

The lower LCD 12 is a display device for displaying the image two-dimensionally (not in a stereoscopic view). The touch panel 13 is one of the input devices of the game device 1. A touch pen 28 that is used for making inputs to the touch panel 13 is housed by being inserted into an insertion slot 17 (shown with a dotted line in FIG. 2). Note that the player's finger can also be used in substitute for the touch pen 28.

The various operation buttons 14A to 14I are input devices for performing predetermined inputs. Functions according to the program to be executed by the game device 1 are appropriately assigned to the buttons 14A to 14I. For example, the cross-shaped button 14A is used for performing selection operations and so on. For example, the respective buttons 14B to 14E are used for performing decision-making operations and cancellation operations. For example, the power button 14F is used for turning ON or OFF the power of the game device 1. For example, the select button 14G is used for the game pause operation or the like. For example, the HOME button 14H is used for the operation to display a predetermined screen. For example, the start button 14I is used for the game start operation or the like. Moreover, the analog stick 15 is a device for commanding directions.

An external memory 45 recording a game program is inserted into the insertion slot 18 (shown with a dotted line in FIG. 2).

The upper housing 21 is provided with an upper LCD 22, an outer left imaging unit 23a, an outer right imaging unit 23b, an inner imaging unit 24, and a 3D adjustment switch 25.

The upper LCD 22 is a display device capable of displaying an image that can be viewed stereoscopically. The upper LCD 22 can display a right eye image and a left eye image by using substantially the same display area. Specifically, the upper LCD 22 is a display device of a system where the right eye image and the left eye image are displayed alternately in the horizontal direction in prescribed units (for example, one row at a time). Note that the upper LCD 22 may also be a display device of a system in which the right eye image and the left eye image are displayed alternately.

Moreover, the upper LCD 22 is a display device which enables glasses-free stereoscopic viewing. In the foregoing case, as the upper LCD 22, used is an LCD which allows the right eye image and the left eye image displayed alternately in the horizontal direction to be respectively broken down and visible to the right eye and the left eye. For example, the upper LCD 22 is an LCD Of a parallax barrier system. The upper LCD 22 displays a stereoscopic image (three-dimensional image) that can be viewed stereoscopically, without requiring the use of glasses, by using the right eye image and the left eye image.

Figure 4:
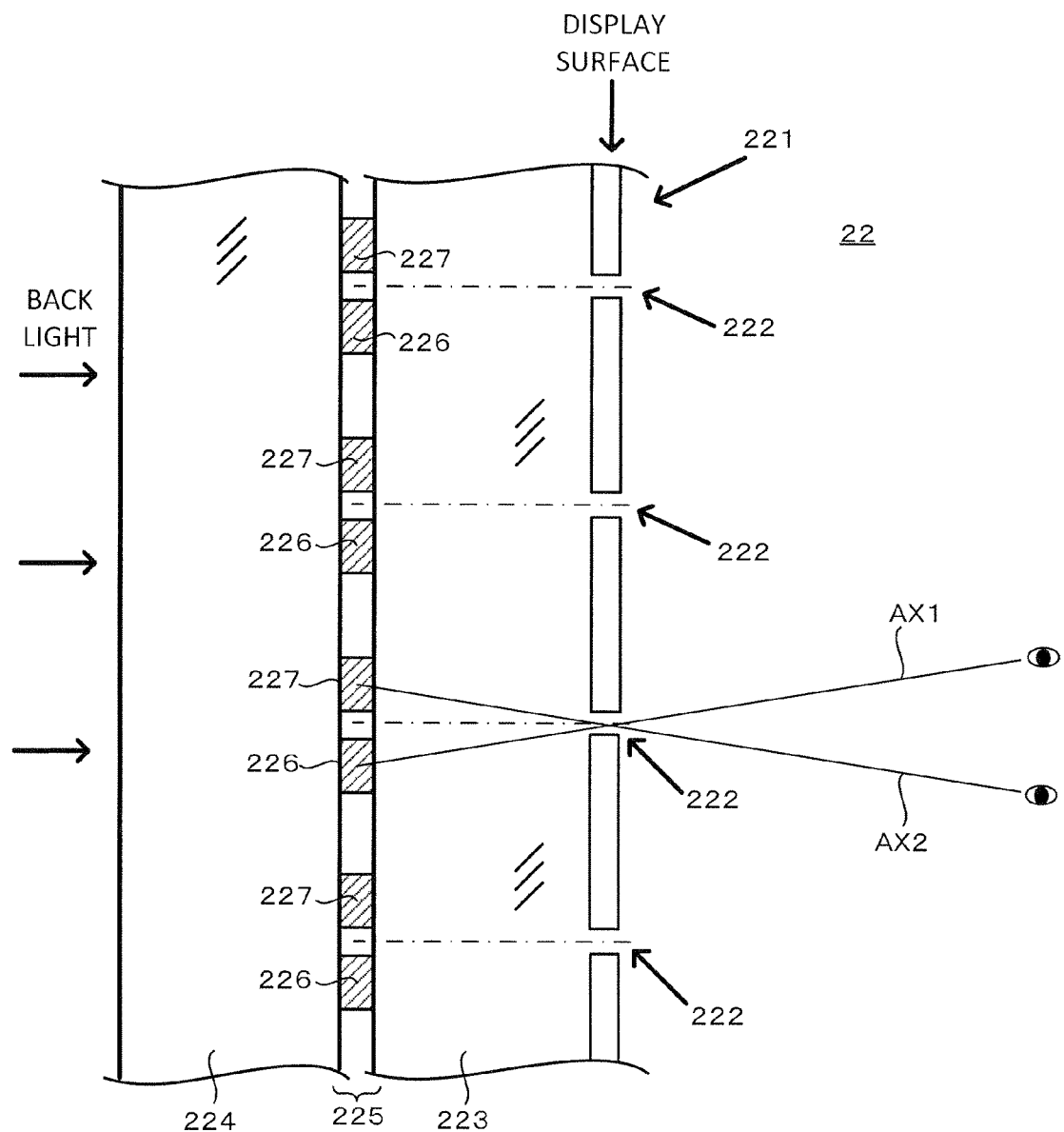
FIG. 4 is a diagram illustrating the upper LCD according to an embodiment of this invention.

FIG. 4 shows an example of the upper LCD 22. The upper LCD 22 includes a first LCD 226 and a second LCD 227 provided in a space 225 between a glass substrate 223 and a glass substrate 224 as shown in FIG. 4. The first LCD 226 and the second LCD 227 include a plurality of pixels, and are spatial light modulators for adjusting the light from the backlight in pixel units. Typically, the first LCD 226 and the second LCD 227 are mutually disposed alternately. As shown in FIG. 4, light from the backlight is irradiated from the glass substrate 224 side.

In the glass substrate 223, a parallax barrier 221 is provided on the side that is opposite to the first LCD 226 and the second LCD 227. The parallax barrier 221 can be realized, for example, with a liquid crystal panel. Thus, the parallax barrier 221 can be provided with slits 222 in predetermined intervals. The pixel corresponding to the first LCD 226 and the pixel corresponding to the second LCD 227 are disposed symmetrically based on the axis that passes through the center position of the respective slits 222 and which is of a perpendicular direction relative to the plane of the glass substrate 223. The respective slits 222 restrict the field of view of the player's right eye and left eye to respectively corresponding angles. For instance, in the example illustrated in FIG. 4, the player's right eye can visually recognize only the image of the first LCD 226 on the optical axis AX1. Moreover, the player's left eye can visually recognize only the image of the second LCD 227 on the optical axis AX2. By appropriately controlling the positional relationship with the pixel corresponding to the slits 222, and the first LCD 226 and the second LCD 227 according to the image to be displayed, a predetermined parallax can be provided between both eyes of the player. In other words, the upper LCD 22 can display a stereoscopic image having a stereoscopic effect to the player by causing the player's right eye to visually recognize the right eye image and the player's left eye to visually recognize the left eye image based on the parallax barrier 221.

Moreover, the upper LCD 22 can disable the parallax barrier. When the parallax barrier is disabled, the upper LCD 22 can display the image two-dimensionally (i.e., display the projected image on a two-dimensional plane that cannot be viewed stereoscopically as described above; that is, this is a display mode where the same displayed image is visible to both the right eye and the left eye). As described above, the upper LCD 22 is a display device that can switch between a three-dimensional display mode of displaying images that can be viewed stereoscopically, and a two-dimensional display mode of displaying the image two-dimensionally. The switching of the display mode is performed by the 3D adjustment switch 25. Note that the upper LCD 22 does not have to be an LCD of a parallax barrier system, and may also be an LCD of a lenticular system or the like.

Returning to FIG. 3, the inner imaging unit 24 is an imaging unit in which the inward normal direction of the inner surface 21A of the upper housing 21 is the imaging direction. The outer left imaging unit 23a and the outer right imaging unit 23b are both imaging units in which the outward normal direction of the outer surface that is opposite to the inner surface 21A is the imaging unit. The outer left imaging unit 23a and the outer right imaging unit 23b are hereinafter collectively referred to as the outer imaging unit 23.

The 3D adjustment switch 25 is a slide switch, and is a switch that is used for switching the display mode of the upper LCD 22 as described above. Moreover, the 3D adjustment switch 25 is used for adjusting the stereoscopic effect of the stereoscopic image that is displayed on the upper LCD 22. The 3D adjustment switch 25 includes a slider capable of sliding to an arbitrary position of a predetermined direction (for instance, the vertical direction), and the display mode of the upper LCD 22 is set according to the position of the slider.

For example, when the slider of the 3D adjustment switch 25 is disposed at the lowest point position, the upper LCD 22 is set to the two-dimensional display mode, and a two-dimensional image is displayed on the screen of the upper LCD 22. Note that it is also possible to keep the upper LCD 22 in the three-dimensional display mode, and achieve the two-dimensional display by causing the left eye image and the right eye image to be the same image. Meanwhile, when the slider is disposed higher than the foregoing lowest point position, the upper LCD 22 is set to the three-dimensional display mode. In the foregoing case, a stereoscopic image is displayed on the screen of the upper LCD 22. Here, when the slider is disposed higher than the foregoing lowest point position, the visibility of the three-dimensional image is adjusted according to the position of the slider. Specifically, the displacement of the position of the horizontal direction in the right eye image and the left eye image is adjusted according to the position of the slider.

Figure 5:
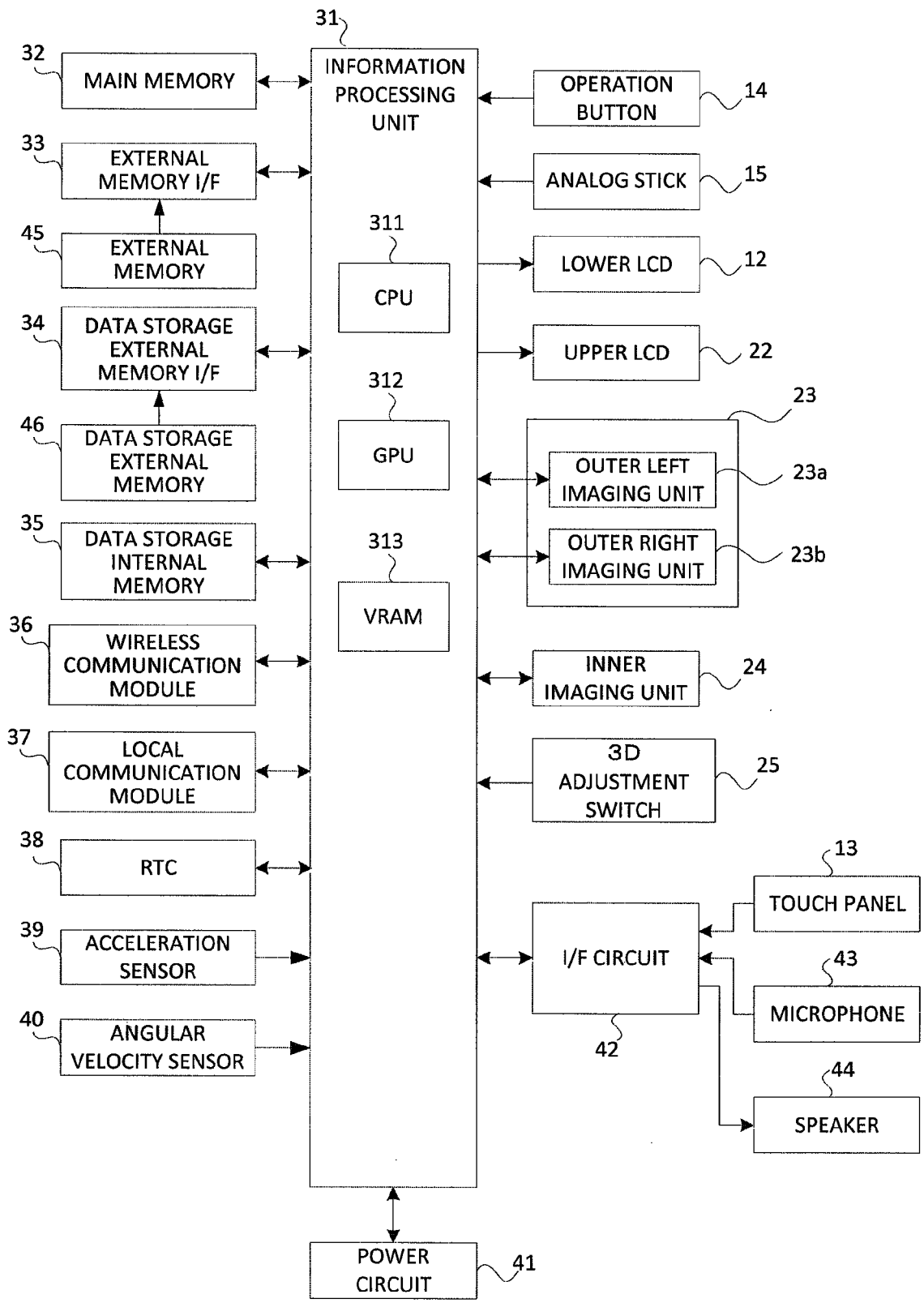
FIG. 5 is a block diagram illustrating the internal configuration of the game device according to an embodiment of this invention.

FIG. 5 is a block diagram showing the internal configuration of the game device 1 according to this embodiment. The game device 1 comprises, in addition to each of the foregoing components described above, electronic components such as an information processing unit 31, a main memory 32, an external memory interface (external memory I/F) 33, a data storage external memory interface (data storage external memory I/F) 34, a data storage internal memory 35, a wireless communication module 36, a local communication module 37, a real time clock (RTC) 38, an acceleration sensor 39, an angular velocity sensor 40, a power circuit 41, and an interface circuit (I/F circuit) 42. These electronic components may be mounted on an electronic circuit board and housed in the lower housing 11 (or the upper housing 21).

The information processing unit 31 includes a CPU (Central Processing Unit) 311 for executing a predetermined program, a CPU (Graphics Processing Unit) 312 for performing image processing, and a VRAM (Video RAM) 313. The CPU 311 executes the predetermined processing by executing the predetermined program stored in the memory (for example, the external memory 45 or the data storage internal memory 35 connected to the external memory I/F 33) in the game device 1. Note that the program to be executed by the CPU 311 of the information processing unit 31 can also be acquired from another apparatus via communication with such other apparatus. The GPU 312 of the information processing unit 31 generates an image according to a command from the CPU 311 of the information processing unit 31, and renders this in the VRAM 313. The image that was rendered in the VRAM 313 is output to and displayed on the upper LCD 22 and/or the lower LCD 12.

A main memory 32, an external memory I/F 33, a data storage external memory I/F 34, and a data storage internal memory 35 are connected to the information processing unit 31. The external memory I/F 33 is an interface for detachably connecting the external memory 45. Moreover, the data storage external memory I/F 34 is an interface for detachably connecting the data storage external memory 46.

The main memory 32 is volatile storage means that is used as the work area or buffer area of the information processing unit (CPU 311). In other words, the main memory 32 is used for temporarily storing various types of data, and temporarily storing the program that is acquired from the outside (external memory 45 or another apparatus). In this embodiment, for example, a PSRAM (Pseudo-Static Random Access Memory) is used as the main memory 32.

The external memory 45 is nonvolatile storage means for storing the program to be executed by the information processing unit 31. The external memory 45 is configured, for example, from a read-only semiconductor memory. When the external memory 45 is connected to the external memory I/F 33, the information processing unit 31 can read the program that is stored in the external memory 45. The predetermined processing is performed as a result of the program that was read by the information processing unit 31 being executed.

The data storage external memory 46 is a readable/writable nonvolatile memory (for instance, a NAND-type flash memory), and is used for storing predetermined data. For example, the data storage external memory 46 is an SD card.

The data storage internal memory 35 is configured from a readable/writable nonvolatile memory (for instance, a NAND-type flash memory), and is used for storing predetermined data. For example, the data storage external memory 46 and the data storage internal memory 35 store the data and programs which were downloaded by way of wireless communication via the wireless communication module 36.

A wireless communication module 36 and a local communication module 37 are connected to the information processing unit 31. The wireless communication module 36 has a function of connecting to a wireless LAN based on, for example, a system that is compliant with the IEEE802.11b/g standard. The information processing unit 31 can send and receive data to and from other apparatuses via the Internet by using the wireless communication module 36, or directly engage in wireless communication with another game device 1 in the ad hoc mode of IEEE802.11b/g. Moreover, the local communication module 37 has a function of performing wireless communication with the same type of game device based on a predetermined communication system (for example, infrared communication). The information processing unit 31 can send and receive data to and from another game device 1 of the same type by using the local communication module 37.

An acceleration sensor 39 is connected to the information processing unit 31. The acceleration sensor 39 detects the size of the acceleration (linear acceleration) in the linear direction along the triaxial direction. Note that the acceleration sensor 39 may be a capacitance-type acceleration sensor or a different type of acceleration sensor. Moreover, the acceleration sensor 39 may also be an acceleration sensor for detecting the uniaxial or biaxial direction. The information processing unit 31 receives the data (acceleration data) showing the acceleration detected by the acceleration sensor 39, and thereby calculates the posture or movement of the game device 1.

An angular velocity sensor 40 is connected to the information processing unit 31. The angular velocity sensor 40 detects each angular velocity that is generated around the three axes of the game device 1, and outputs the data (angular velocity data) showing the detected angular velocity to the information processing unit 31. The information processing unit 31 receives the angular velocity data that was output from the angular velocity sensor 40, and thereby calculates the posture and movement of the game device 1.

An RTC 38 and a power circuit 41 are connected to the information processing unit 31. The RTC 38 measures the time and outputs the result to the information processing unit 31. The information processing unit 31 calculates the current time based on the time that was measured by the RTC 38. The power circuit 41 controls the electrical power from the power source of the game device 1 (for example, a rechargeable battery housed in the lower housing 11), and thereby supplies electrical power to the respective components of the game device 1.

An I/F circuit 42 is connected to the information processing unit 31. A microphone 43, a speaker 44, and a touch panel 13 are connected to the I/F circuit 42. The microphone 43 detects the user's voice and outputs the voice signal to the I/F circuit 42. The speaker 44 amplifies the voice signal from the I/F circuit 42 with an amplifier (not shown), and outputs the voice. The I/F circuit 42 includes a voice control circuit for controlling the microphone 43 and the speaker 44, and a touch panel control circuit for controlling the touch panel 13. The voice control circuit performs the A/D conversion or D/A conversion to the voice signal, and converts the voice signal into voice data of a predetermined format. In this embodiment, as the touch panel 13, a resistive touch panel is used.

However, the touch panel 13 is not limited to a resistive touch panel, and, for example, a capacitance-type or arbitrary press-type touch panel can also be used. The touch panel control circuit generates touch position coordinates of the touch panel 13 of a predetermined format based on the signal from the touch panel 13, and outputs this to the information processing unit 31. The information processing unit 31 can identify the touch position where the input was made to the touch panel 13 by acquiring the touch position data.

The operation button 14 and the analog stick 15 are connected to the information processing unit 31, and outputs, to the information processing unit 31, the operation data showing the input status (whether it has been pressed) of the various operation buttons (for example, 14A to 14I, 15 in FIG. 3). The information processing unit 31 executes the processing according to the input that was made to the operation button 14 and the analog stick 15 by acquiring the operation data from the operation button 14 and the analog stick 15.

The lower LCD 12 and the upper LCD 22 are connected to the information processing unit 31. The lower LCD 12 and the upper LCD 22 display the image according to the command from the information processing unit 31 (GPU 312). The lower LCD 12 is a display device which displays the image two-dimensionally (not stereoscopically) The number of pixels of the lower LCD 12 is, for example, 320 dots×240 dots (horizontal×vertical). Note that, in this embodiment, although an LCD is being used as the display device, for example, a display device using EL (Electro Luminescence) or other display devices can also be used. Moreover, as the lower LCD 12, a display device having the intended resolution can also be used.

The upper LCD 22 is a display device that enables glasses-free stereoscopic viewing. The information processing unit 31 is connected, for example, to an LCD controller (not shown) of the upper LCD 22. The information processing unit 31 controls the ON/OFF of the parallax barrier in the LCD controller. When the parallax barrier of the upper LCD 22 is ON, for example, the right eye image and the left eye image stored in the VRAM 313 of the information processing unit 31 are output to the upper LCD 22.

More specifically, the LCD controller reads the right eye image and the left eye image from the VRAM 313 by alternately repeating the processing of reading the pixel data of one line worth of the right eye image in the vertical direction and the processing of reading the pixel data of one line worth of the left eye image in the vertical direction. Consequently, the right eye image and the left eye image are divided into strip images in which the pixels are aligned vertically for each line, and the image in which the strip image of the right eye image and the strip image of the left eye image which were divided being disposed alternately is displayed on the screen of the upper LCD 22. As a result of the image being visually recognized via the parallax barrier 221 of the upper LCD 22, the right eye image is visually recognized by the user's right eye and the left eye image is visually recognized by the user's left eye. Consequently, an image (stereoscopic image) that can be viewed stereoscopically is displayed on the screen of the upper LCD 22.

Note that the number of pixels of the upper LCD 22 is, for example, 800 dots×240 dots (horizontal×vertical). In this embodiment, the upper LCD 22 is explained as a liquid crystal display device. However, without limitation thereto, for example, an EL display device or the like can also be used. Moreover, as the upper LCD 22, a display device of an arbitrary resolution can be used.

The outer imaging unit 23 and the inner imaging unit 24 are connected to the information processing unit 31. The outer imaging unit 23 and the inner imaging unit 24 take images according to the command from the information processing unit 31, and output the image data that was taken to the information processing unit 31.

The inner imaging unit 24 includes an imaging element having a predetermined resolution, and a lens. The imaging element is, for example, a CCD (Charge Coupled Device) image sensor, a CMOS (Complementary Metal Oxide Semiconductor) image sensor, or the like. The lens may have a zoom mechanism.

The outer left imaging unit 23a and the outer right imaging unit 23b respectively include an imaging element (for instance, a CCD image sensor, a CMOS image sensor or the like) having a predetermined common resolution, and a lens. The lens may have a zoom mechanism. With the outer left imaging unit 23a and the outer right imaging unit 23b, one of the two outer imaging units (outer left imaging unit 23a and outer right imaging unit 23b) can be used independently based on a program to be executed by the game device 1. In this embodiment, explained is a case of using only one of the outer imaging units.

The 3D adjustment switch 25 is connected to the information processing unit 31. The 3D adjustment switch 25 sends an electric signal according to the position of the slider to the information processing unit 31.

[Processing Example of Stereoscopic Viewing]

The stereoscopic viewing that is processed in the game device 1 according to this embodiment is now explained with reference to FIGS. 6 to 10. Note that the conditions shown in these diagrams correspond to the game status shown in FIGS. 1B and 2B.

Figure 6:
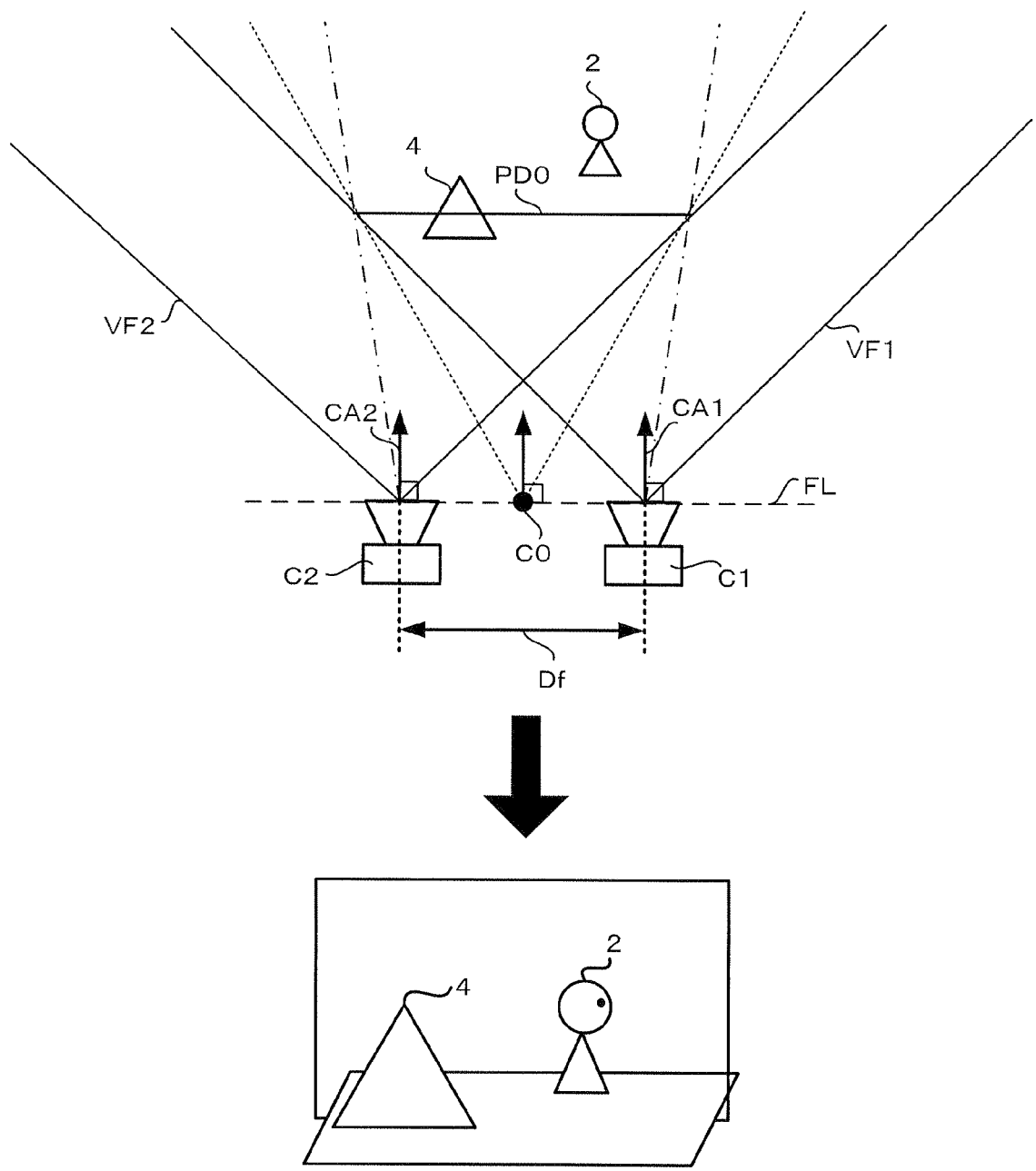
FIG. 6 is a diagram illustrating the rendering processing of the stereoscopic image according to an embodiment of this invention.

FIG. 6 illustrates the rendering processing of the stereoscopic image that expresses the game space containing the character 2 and the obstacle 4. In the rendering processing of the stereoscopic image according to this embodiment, as shown in FIG. 6, two virtual cameras (C1, C2) are used. However, the number of virtual cameras is not limited to two. For example, one camera may take images by shifting to the positions of the two virtual cameras (C1, C2) in this embodiment.

Here, the right virtual camera C1 is a virtual camera for rendering the right eye image. Moreover, the left virtual camera C2 is a virtual camera for rendering the left eye image. In this embodiment, as a result of a pair of right eye image and left eye image that is rendered by using the two virtual cameras (C1, C2) being displayed on the upper LCD 22, the player can experience the three-dimensional visual sensation of the game space.

As shown in FIG. 6, the two virtual cameras (C1, C2) are arranged by being mutually separated at a distance Df. Based on the foregoing arrangement, parallax according to the distance Df in the virtual space is generated between the right eye image that is rendered with the right virtual camera C1 and the left eye image that is rendered with the left virtual camera C2. Specifically, as the distance Df is made longer, the parallax of the object existing at a certain position in the game space will increase. In other words, as the distance Df is made longer, the object will be visually recognized by the player with a greater stereoscopic effect. However, when the parallax is increased beyond a certain level, it becomes difficult for the player to experience the stereoscopic effect. Thus, the distance Df needs to be set appropriately. Note that, in this embodiment, the term parallax means the difference invisibility of the observation point between the image that is visibly recognized by the player's right eye and the image that is visibly recognized by the player's left eye.

In this embodiment, the two virtual cameras (C1, C2) are arranged with the center point C0 as the reference. The center point C0 is the arrangement position of the virtual cameras when the distance Df between the two virtual cameras (C1, C2) is 0. The two virtual cameras (C1, C2) are set as virtual cameras existing at positions separated by a distance "Df/2" in the left and right directions with the center point C0 as the reference.

Moreover, the right virtual camera C1 is a virtual camera for imaging the game space of the camera direction CA1. The left virtual camera C2 is a virtual camera for imaging the game space of the camera direction CA2. As shown in FIG. 6, the two virtual cameras (C1, C2) are set so that the camera directions (CA1, CA2) of the two virtual cameras (C1, C2) become mutually parallel.

In addition, the positions and camera directions (CA1, CA2) of the two virtual cameras (C1, C2) are set so that the camera directions (CA1, CA2) of the two virtual cameras (C1, C2) and the straight line (fiducial line FL) which passes through the positions of the two virtual cameras (C1, C2) become perpendicular.

The positions and camera directions (CA1, CA2) of the two virtual cameras (C1, C2) are thereby set. However, the setting method of the two virtual cameras (C1, C2) is not limited to the foregoing setting method. For example, after the position and direction of one virtual camera of the two virtual cameras (C1, C2) are set, the position and direction of the other virtual camera can be set as the reference of the virtual camera that was set.

Note that, when Df=0 based on the foregoing settings, the two virtual cameras (C1, C2) become virtual cameras with mutually the same setting. In other words, the images that are taken by the two virtual cameras (C1, C2) become the same image. In the foregoing case, the image that is displayed on the upper LCD 22 becomes an image with no stereoscopic viewing effect.

When the positions and camera directions (CA1, CA2) of the two virtual cameras (C1, C2) are set, the visual fields (VF1, VF2) of the two virtual cameras (C1, C2) are set. Here, the display target range (typically, a zero parallax plane PD0 in which the parallax from the two virtual cameras (C1, C2) becomes zero) is designated as a range to be displayed in the vicinity of the display surface of the upper LCD 22 in the case of realizing a stereoscopic display. Specifically, the display target range corresponds to the area to be displayed on the upper LCD 22 at least in the game space. The plane of the display target range is perpendicular to the camera directions (CA1, CA2). Moreover, the display target range is set to the side of the camera directions (CA1, CA2) with the two virtual cameras (C1, C2) as the reference. The visual fields of the two virtual cameras (C1, C2) are respectively set so that both visual fields of the two virtual cameras (C1, C2) are included in the display target range. Here, the direction that extends from the center point C0 to the center of the display target range coincides with the camera directions (CA1, CA2). Note that the zero parallax plane PD0 shown in FIG. 6 is the reference plane which sets forth the position where parallax from the two virtual cameras (C1, C2) is not generated. In FIG. 6, the visual fields (VF1, VF2) of the two virtual cameras (C1, C2) are respectively shown with solid lines. The range of the zero parallax plane PD0 pertaining to the virtual camera C1 is represented as the range that is sandwiched between the solid line that is closer to the virtual camera C2 among the foregoing solid lines, and the dashed line with the position of the virtual camera C1 in FIG. 6 as the origin. Note that the range of the zero parallax plane PD0 pertaining to the virtual camera C2 is represented in the same manner as the range of the zero parallax plane PD0 pertaining to the virtual camera C1. The zero parallax plane PD0 will be described later.

As a result of the pair of right eye image and left eye image that is rendered by respectively using the two virtual cameras (C1, C2) that are set as described above being displayed on the upper LCD 22, the player can experience a three-dimensional visual sensation of the game space.

Figure 7:
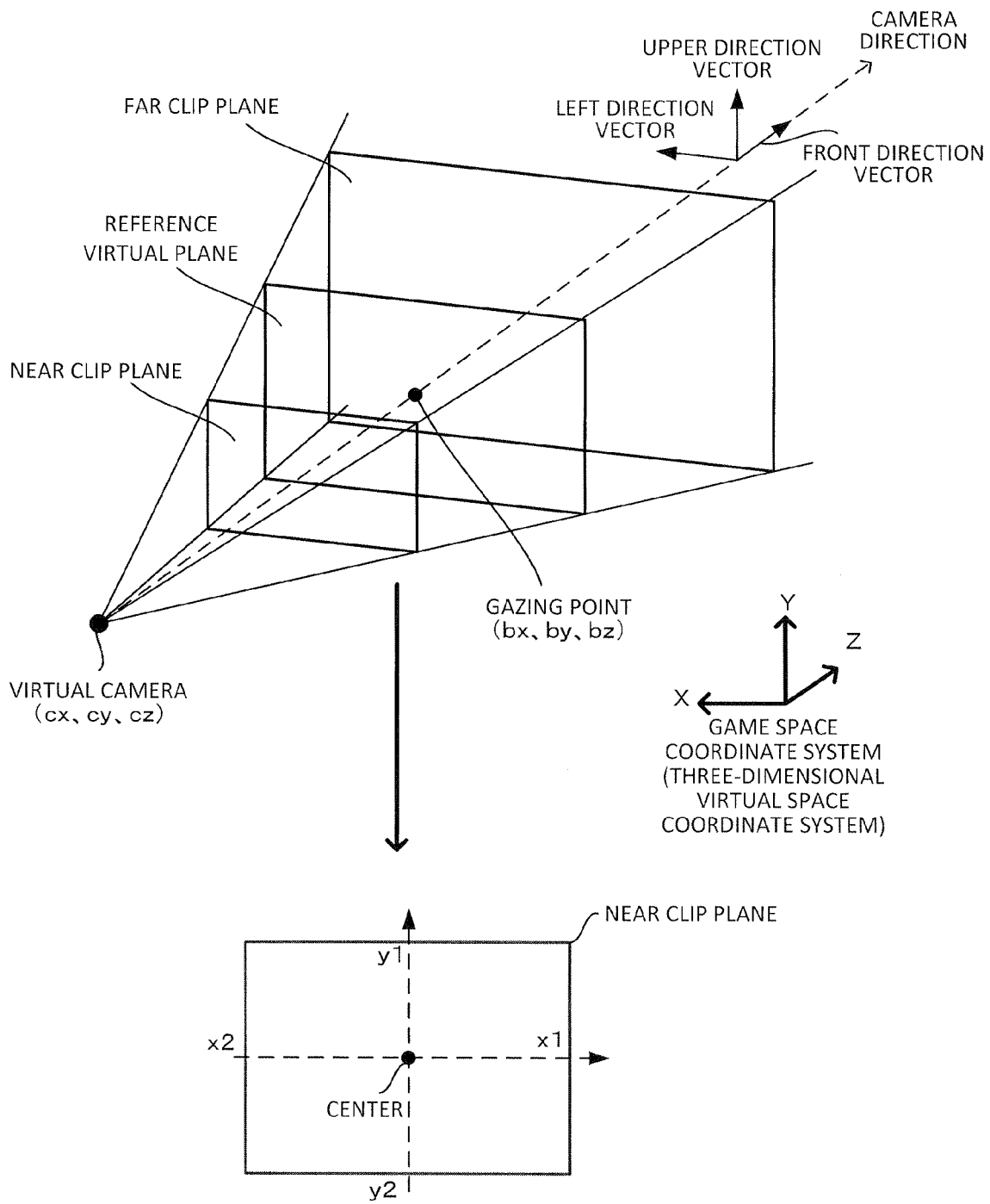
FIG. 7 is a diagram illustrating the setting of the virtual camera according to an embodiment of this invention.

FIG. 7 illustrates the setting of the respective virtual cameras (C1, C2). A visual field is set in the virtual camera according to this embodiment in which the rendering of a two-dimensional image using the respective virtual cameras (C1, C2) is explained with reference to FIG. 7. The visual field is set forth, for example, based on the view angle of the virtual camera. In other words, the visual field shows the range that is visible from the virtual camera.

Moreover, a near clip plane is set to the near side and a far clip plane is set to the far side in the virtual camera. The near clip plane and the far clip plane are respectively set so that they will be perpendicular to the line of the camera direction of the virtual cameras. In this embodiment, the object to be imaged by the virtual camera is the object existing between the near clip plane and the far clip plane, and the object included in the view angle of the virtual camera. In other words, the range (filming target range) to be filmed by the virtual camera is the range between the near clip plane and the far clip plane of the visual fields of the virtual cameras. Note that the filming target range can also be set forth based on the distance between the plane to be filmed such as the near clip plane and the virtual camera, the width of the plane to be filmed, and the height of the plane to be filmed.

The filming target range upon generating an image based on virtual filming with a virtual camera is also referred to as a view volume. More specifically, the solid (truncated quadrangular pyramid) remaining after cutting a pyramid with the position of the virtual camera as the vertex and the near clip plane as the bottom surface from the overall pyramid with the position of the virtual camera as the vertex and the far clip plane as the bottom surface is referred to as the view volume. A quadrangular pyramid with the near clip plane as one plane and the far clip plane as the other plane is referred to as the view volume. Note that the view volume is also referred to as a view frustum or a frustum. Accordingly, the space contained inside the view volume is the filming target of the virtual camera.

Moreover, in order to identify the zero parallax plane PD0 described later, a reference virtual plane is set in the virtual camera in this embodiment. The reference virtual plane is a plane corresponding to the position of the display surface of the upper LCD 22. To put it differently, the reference virtual plane is the plane in which the player, who is viewing a stereoscopic image displayed on the upper LCD 22, will feel that it exists at the position of the display surface of the upper LCD 22 in the three-dimensional virtual space. This reference virtual plane is also set to become perpendicular to the camera direction. Note that the reference virtual plane may also be a plane in which the player, who is viewing a stereoscopic image displayed on the upper LCD 22, will feel that it exists at the position subject to a predetermined offset from the display surface of the upper LCD 22 in the three-dimensional virtual space. The zero parallax plane PD0 described later is identified as the plane included in the reference virtual plane.

As shown in FIG. 7, let it be assumed that provided area a game space coordinate system (X, Y, Z) as the three-dimensional virtual space coordinate system, a position (cx, cy, cz) of the virtual camera, and a gaze point (bx, by, bz) as the intersection of the straight line extending from the position of the virtual camera to the camera direction of the virtual camera and the reference virtual plane. Moreover, the vector showing the direction of the virtual camera is defined as the front direction vector (Zx, Zy, Zz), upward direction vector (Yx, Yy, Yz), and left direction vector (Xx, Xy, Xz) with the straight line connecting the position of the virtual camera and the gaze point as the reference. The front direction vector is the vector which defines the orientation of the front direction of the virtual camera. The upward direction vector is the vector which defines the orientation of the upward direction relative to the orientation of the front direction of the virtual camera. The left direction vector is the vector which defines the orientation of the left direction relative to the orientation of the front direction of the virtual camera. The coordinate system (view coordinate system) of the space viewed from the virtual camera is defined by the foregoing three vectors. Note that these vectors can be obtained from the position (cx, cy, cz) of the virtual camera and the gaze point (bx, by, bz), and the size of the respective vectors shall be a unit vector of 1. In addition, let it be assumed that the distance from the virtual camera to the near clip plane is n, and the distance from the virtual camera to the far clip plane is f. Moreover, in the planar coordinates with the center of the near clip plane as the origin, let it be assumed that the right end of the near clip plane is x1, the left end of the near clip plane is x2, the upper end of the near clip plane is y1, and the lower end of the near clip plane is y2.

In this embodiment, in order to obtain a two-dimensional image that is rendered using the virtual camera, used is a camera matrix containing a view matrix for converting the game space coordinate system into a view coordinate system viewed from the virtual camera, and a projection matrix for converting the view coordinate system into a screen coordinate system (two-dimensional coordinates) to be displayed on the upper LCD 22. The following [Formula 1] is an example of the view matrix. Moreover, the following [Formula 2] is an example of the projection matrix. These matrixes can be obtained as needed based on the setting values of the visual fields that are set as described above.

$$\begin{bmatrix} -Xx & -Xy & -Xz & cx \times Xx + cy \times Xy + cz \times Xz \\ Yx & Yy & Yz & -cx \times Yx - cy \times Yy - cz \times Yz \\ -Zx & -Zy & -Zz & cx \times Zx + cy \times Zy + cz \times Zz \end{bmatrix} \quad \text{[Formula 1]}$$

$$\begin{bmatrix} \frac{2 \times n}{x2 - x1} & 0 & \frac{x2 + x1}{x2 - x1} & 0 \\ 0 & \frac{2 \times n}{y1 - y2} & \frac{y1 + y2}{y1 - y2} & 0 \\ 0 & 0 & \frac{-(f + n)}{f - n} & \frac{-2 \times f \times n}{f - n} \\ 0 & 0 & -1 & 0 \end{bmatrix} \quad \text{[Formula 2]}$$

As a result of using this camera matrix, it is possible to obtain an image in which the space contained inside the view volume is projected on the projection plane of the reference virtual plane. In other words, a two-dimensional image of the filming target range of the virtual camera can be obtained by using the camera matrix.

Note that, in [Formula 2], although illustrated is a projection matrix that is generated by using the position (size) of all sides defining the near clip plane, the projection matrix can also be generated based on the view angle of the virtual camera.

Figure 8:
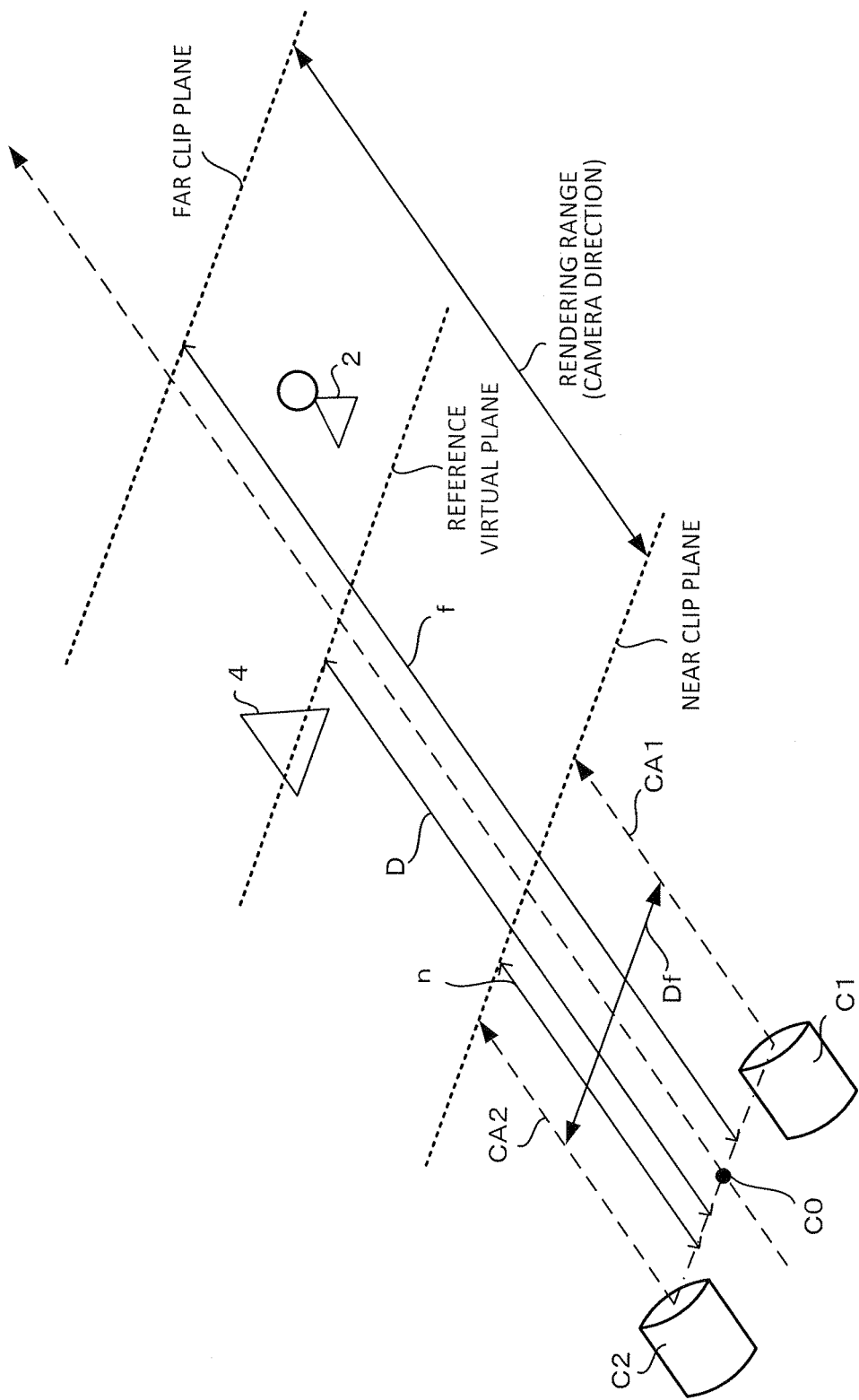
FIG. 8 is a diagram illustrating the relationship of the virtual camera and the object according to an embodiment of this invention.
Figure 9:
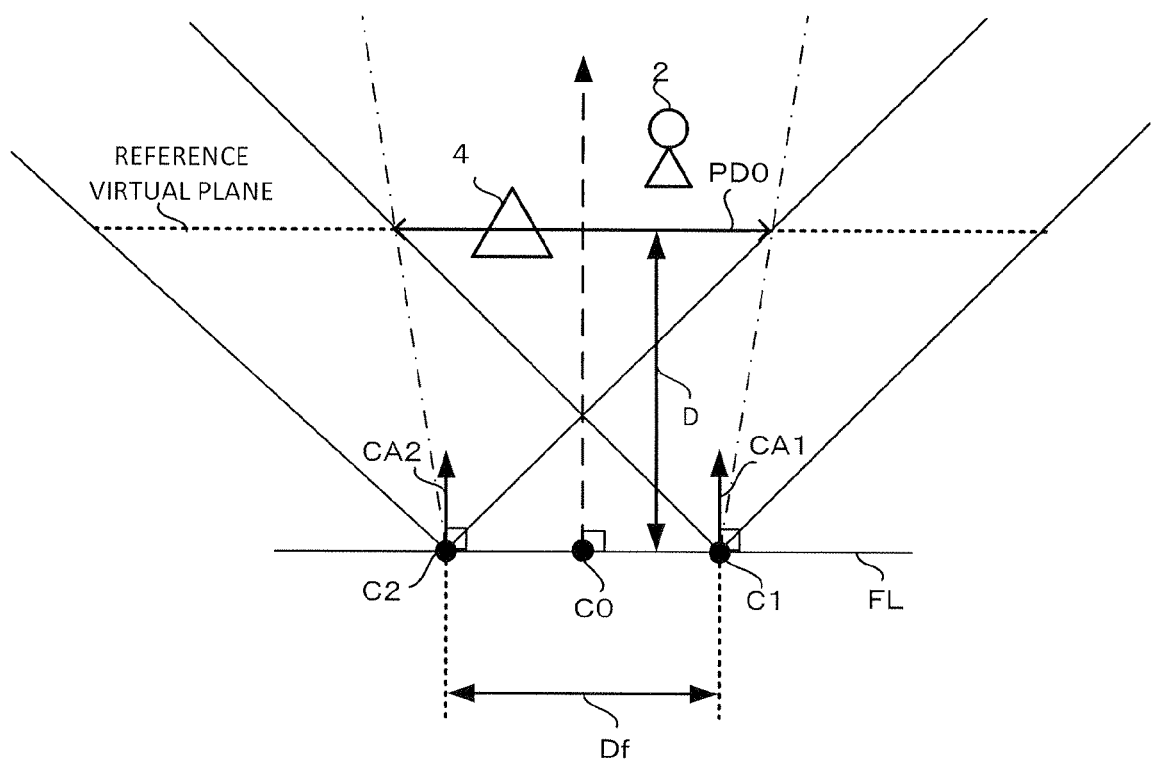
FIG. 9 is a diagram illustrating the rendering processing that is performed by the virtual camera according to an embodiment of this invention.
Figure 10:
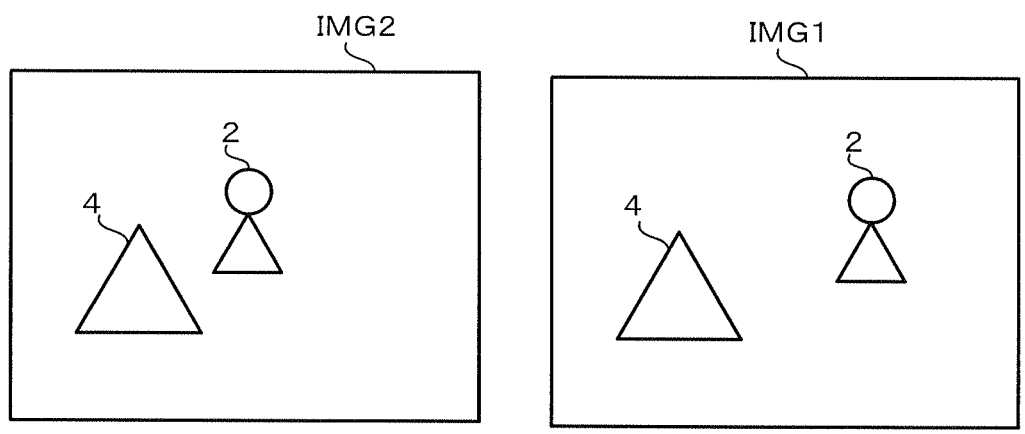
FIG. 10 is a diagram illustrating the image that is rendered by the virtual camera according to an embodiment of this invention.

FIG. 8 illustrates the relationship of the setting of the two virtual cameras (C1, C2) explained with reference to FIG. 6 and the respective virtual cameras explained with reference to FIG. 7. FIG. 9 illustrates the rendering processing of the images (right eye image and left eye image) that are rendered in the state shown in FIG. 8. FIG. 10 illustrates the images that are rendered by using the right virtual camera C1 and the left virtual camera C2 shown in FIG. 9.

The two virtual cameras (C1, C2) respectively render the objects in a predetermined range of the respective camera directions among the objects existing in the three-dimensional virtual space. The filming target range of the respective virtual cameras is, as described above, the range that is included in the view volume that is set forth by the view angle, the near clip plane, the far clip plane and the like.

Here, as shown in FIG. 9, in the range included in the view volume of the respective virtual cameras, the zero parallax plane PD0 is set in a range that can be filmed by the right virtual camera C1 and the left virtual camera C2 in the reference virtual plane that is set at a position that is at a distance D from the respective virtual cameras. The reference virtual plane is, as described above, a plane in which the player, who is viewing a stereoscopic image displayed on the upper LCD 22, feels that it exists at the position of the display surface of the upper LCD 22 in the three-dimensional virtual space. Thus, the zero parallax plane PD0 is the plane that can be filmed by the two virtual cameras (C1, C2), and is a plane in which the player, who is viewing a stereoscopic image displayed on the upper LCD 22, feels that it exists at a position on the display surface of the upper LCD 22 in the three-dimensional virtual space. In other words, on the zero parallax plane PD0, the parallax from the two virtual cameras (C1, C2) becomes zero. Note that the visual fields of the two virtual cameras (C1, C2) in FIG. 9 are shown with solid lines. The range of the zero parallax plane PD0 pertaining to the virtual camera C1 is represented as the range that is sandwiched between the solid line that is closer to the virtual camera C2 among the foregoing solid lines, and the dashed line with the position of the virtual camera C1 in FIG. 9 as the origin. Note that the range of the zero parallax plane PD0 pertaining to the virtual camera C2 is represented in the same manner as the range of the zero parallax plane PD0 pertaining to the virtual camera C1.

The game device 1 renders the range of the zero parallax plane PD0 among the ranges that can be filmed by the respective virtual cameras by using the respective cameras of the right virtual camera C1 and the left virtual camera C2. The right eye image can be obtained by performing rendering using the right virtual camera C1. Moreover, the left eye image can be obtained by performing rendering using the left virtual camera C2. FIG. 10 illustrates the right eye image IMG 1 and the left eye image IMG 2 obtained as described above.

As shown in FIG. 10, (the portion of) the object that is positioned on the zero parallax plane PD0 is rendered at the same position in both the right eye image IMG 1 and the left eye image IMG 2. For example, the object positioned on the zero parallax plane PD0 is the obstacle 4. The obstacle 4 is rendered at the same position in both the right eye image IMG 1 and the left eye image IMG 2 as shown in FIG. 10. Meanwhile, (the portion of) the object that is positioned away from the zero parallax plane PD0 is rendered at different positions in the right eye image IMG 1 and the left eye image IMG 2. For example, the object that is positioned away from the zero parallax plane PD0 is the character 2. The character 2 is rendered at different positions in the right eye image IMG 1 and the left eye image IMG 2 as shown in FIG. 10. As a result of the foregoing right eye image IMG 1 and left eye image IMG 2 being rendered on the upper LCD 22, the player can experience a three-dimensional visual sensation.

As described above, with the stereoscopic viewing according to this embodiment explained with reference to FIGS. 6 to 10, the stereoscopic effect that is felt by the player is operated by the distance Df between the two virtual cameras (C1, C2). In other words, the game device 1 can present a stereoscopic effect that will be pleasant for the player by appropriately setting the distance Df.

Moreover, the position in the game space in which the player feels that it exists at the position on the display surface of the upper LCD 22 is operated by the distance D between the respective virtual cameras (C1, C2) and the zero parallax plane PD0 (reference virtual plane). In other words, the game device 1 can change the position in the game space in which the player feels that it exists at the position on the display surface of the upper LCD 22 by changing the distance D. Under normal circumstances, the player views the display surface by focusing attention on the position on the display surface of the upper LCD 22. Accordingly, generally speaking, the closer the object is positioned in the vicinity of the position of the upper LCD 22, the player can more easily comprehend the state of the object such as its depth. In other words, as a result of setting the distance D so that the zero parallax plane PD0 is positioned in the vicinity of the object for which the player should comprehend the status such as the depth, the player can more easily comprehend the status of the object such as its depth. As described above, the game device 1 can provide a stereoscopic image which enables the user to appropriate comprehend the status of the object such as its depth by appropriately setting the distance D.

The game device 1 according to this embodiment sets the distance Df or distance D according to the area that is set in the game space in order to enable the player to appropriately comprehend such area, and thereby renders the stereoscopic image (right eye image and left eye image).

Note that the processing of stereoscopic viewing according to this embodiment is based on the so-called parallel method. However, the processing of the stereoscopic viewing of the present invention is not limited to the parallel method. For example, the processing of the stereoscopic viewing of the present invention can also be an intersection technique. If the processing of the stereoscopic viewing is the intersection technique, the zero parallax plane PD0 is provided, for example, as the gaze point.

[Retained Information]

Figure 11:
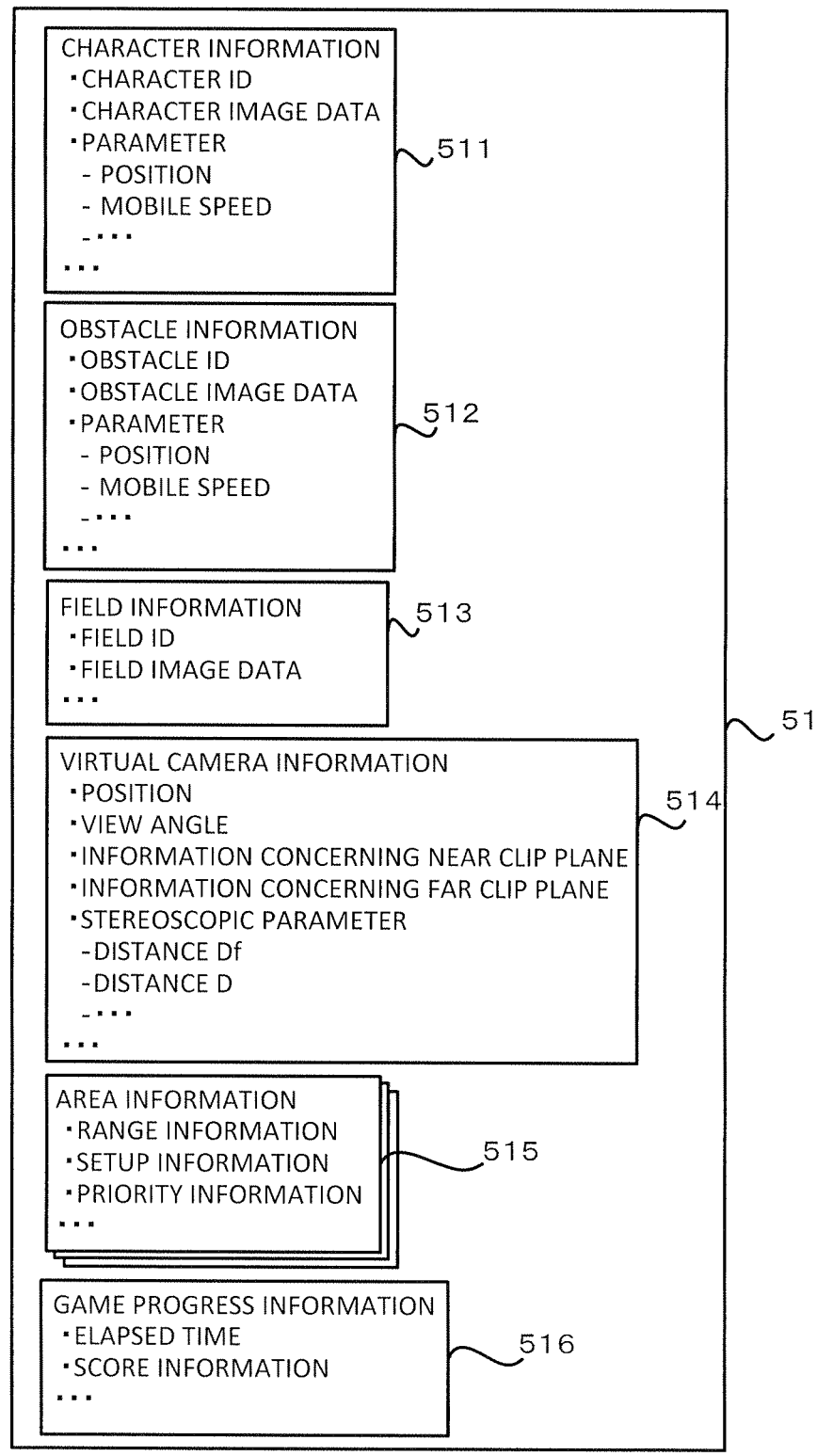
FIG. 11 is a diagram illustrating the information that is retained by the game device according to an embodiment of this invention.

FIG. 11 illustrates the information that is retained by the game device 1 according to this embodiment. The game device 1 retains character information 511, obstacle information 512, field information 513, virtual camera information 514, area information 515, game progress information 516, and so on. The foregoing information is retained in the storage unit 51 described later.

The character information 511 is information concerning the character 2. In other words, the character information 511 is information concerning an object to be operated by the game device 1. The character information 511 includes, for example, a character ID for identifying the character 2, character image data for displaying the character 2, and parameters concerning the status of the character 2. Note that the status of the character 2 is, for example, the position of the character 2 in the game space, the mobile speed of the character 2, and so on.

The obstacle information 512 is information concerning the obstacle 4. In other words, the obstacle information 512 is information concerning an object that is not to be operated by the game device 1. The obstacle information 512 includes, for example, an obstacle ID for identifying the obstacle 4, obstacle image data for displaying the obstacle 4, and parameters concerning the status of the obstacle 4. Note that the status of the obstacle 4 is, for example, the position of the obstacle 4, the mobile speed of the obstacle 4, and so on.

The field information 513 is information concerning the field 3. In other words, the field information 513 is information concerning the field (map) of the game pertaining to the game device 1. The field information 513 includes a field ID for identifying the field, field image data for displaying the field 3, and so on.

The virtual camera information 514 is information concerning the right virtual camera C1 and the left virtual camera C2. In other words, the virtual camera information 514 is information that is used for setting the virtual cameras which are used for rendering the game space. In this embodiment, the virtual camera 514 includes the coordinates (position of the virtual cameras) in the game space of the center point C0, the view angles of the respective virtual cameras, information concerning the near clip plane, information concerning the far clip plane, and information concerning the distance Df between the two virtual cameras (C1, C2) and the distance D between the respective virtual cameras (C1, C2) and the zero parallax plane PD0. Information concerning the near clip plane is, for example, information concerning the distance from the virtual camera to the near clip plane, and so on. Moreover, information concerning the far clip plane is, for example, information concerning the distance from the virtual camera to the far clip plane, and so on.

The information contained in the virtual camera information 514 includes stereoscopic parameters as information pertaining to the rendering of the stereoscopic image (right eye image and left eye image) based on the two virtual cameras (C1, C2). The stereoscopic parameters are the parameters which are used by the game device 1 for rendering the stereoscopic image.

In this embodiment, the stereoscopic parameters are the distance Df between the two virtual cameras (C1, C2), and the distance D between the respective virtual cameras (C1, C2) and the zero parallax plane PD0. The distance Df corresponds to the "parameter concerning a sense of depth of the stereoscopic image" of the present invention. Moreover, the distance D corresponds to the "parameter concerning a reference plane which sets forth a position in the virtual space where parallax will not occur" of the present invention. For example, by appropriately setting the distance Df contained in the stereoscopic parameter, the game device 1 can provide a stereoscopic image which offers a stereoscopic effect that will be pleasant for the player. Moreover, by appropriately setting the distance D contained in the stereoscopic parameter, the game device 1 can provide a stereoscopic image in which the player can appropriately comprehend the status of the object such as its depth. Based on the foregoing influences, the player can appropriately comprehend the game space that is represented with a stereoscopic image.

Note that the stereoscopic parameter does not necessarily have to contain both distances Df and D. For example, one distance may be contained in the stereoscopic parameter, and the other distance may be set forth as a fixed value and not be contained in the stereoscopic parameter.

Moreover, the stereoscopic parameter does not necessarily have to be the distance Df and the distance D themselves. The stereoscopic parameter can also be a parameter which enables the calculation of the distance Df and the distance D; for example, the distance Df, and the ratio of the distance Df and the distance D.

Moreover, the stereoscopic parameter can also contain parameters for setting forth the filming range of the stereoscopic image to be rendered such as the position of the near clip plane and the position of the far clip plane.

For example, since the objected positioned between the virtual camera and the near clip plane is not rendered, the object to the rendered with the virtual camera can be appropriately selected by appropriately setting the position of the near clip plane. Specifically, if an object that will block the visual field of the virtual camera exists in the vicinity of the virtual camera, that object can be excluded from the rendering target of the virtual camera by setting the position of the near clip plane so that the object is not included as the rendering target. Consequently, since the object that will block the visual field of the virtual camera is not rendered, it is possible to render a stereoscopic image in which the player can better comprehend the game space.

Moreover, for example, since an object that is positioned farther back than the far clip plane when viewed from the virtual camera is not rendered, the object to be rendered with the virtual camera can be appropriately selected by appropriately setting the position of the far clip plane. Specifically, with the camera direction of the virtual camera as the reference, there are cases where the object existing on the front side and the object existing at the back side are of the same color. In the foregoing case, by setting the position of the far clip plane so that the object existing at the back side is not rendered, the object on the back side can be excluded from the rendering target of the virtual camera. Consequently, since the object existing on the back side of the same color as the object existing on the front side will not be rendered, it is possible to render a stereoscopic image in which the player can better comprehend the game space.

The area information 515 is information concerning the plurality of areas that were set in the game space. The game device 1 identifies the area where the character 2 is positioned among the plurality of areas set in the game space. Subsequently, the game device 1 sets the foregoing stereoscopic parameters according to the identified area. In this embodiment, the area information 515 includes range information showing the range of the respective areas which are required for identifying the area where the character 2 is positioned, setup information which is required for the game device 1 to performing the setting of the stereoscopic parameters, and priority information showing the priority among the areas. Note that, in this embodiment, the area information 515 is the area information of a plurality of cases that are prepared for each area. The area information of each case includes the range information, the setup information, and the priority information concerning the respective areas.

In this embodiment, the range information contained in the area information of the respective cases shows the range of the respective areas in the game space. The game device 1 can recognize the range of the respective areas in the game space based on the foregoing range information. The range information is described, for example, based on (1) center coordinates of the sphere and radius of the sphere, (2) central axis of the circular cylinder, coordinates showing the range of length of the central axis, and radius of the circular cylinder, and (3) a vertex sequence of the 8 vertexes of the cuboid, and so on.

Moreover, in this embodiment, the setup information contained in the area information of the respective cases contains a rendering setup parameter for setting the stereoscopic parameter (distances Df and D) according to the respective areas. The game device 1 uses the value shown in the rendering setup parameter to set the value of the stereoscopic parameter. Note that the setup information can also be a table or database storing values to be set in the stereoscopic parameter (distances Df and D) in the respective areas with the area ID for identifying the area as the key.

Note that the information for setting the stereoscopic parameter according to the respective areas is not limited to the setup information (rendering setup parameter) contained in the area information of the respective cases. For example, the area information 515 can also include a rendering setup function which the area ID showing the identified area as the input and the value for setting the stereoscopic parameter as the output in substitute for the setup information (rendering setup parameter) contained in the area information of the respective cases. The rendering setup function does not need to be prepared for the area information of each case, and can also be prepared to be common for the respective cases.

Moreover, since the stereoscopic parameter can be set by switching the area where the character 2 is positioned, there are cases where the rendering setup parameter and the rendering setup function are not required. In the foregoing case, the setup information may be omitted. As an example in the foregoing case, considered is a case where a plurality of areas are set according to predetermined rules. A case where a plurality of areas are set according to predetermined rules is, for example, a case where two types of areas are alternately set in the game space. In the foregoing case, the stereoscopic parameter can be switched according to the switching of the area where the character 2 is positioned. Thus, in the foregoing case, the game device 1 can set the stereoscopic parameter according to the respective areas without having to use to the foregoing setup information. In the foregoing case, the setup information can be omitted.

Moreover, in this embodiment, the priority information contained in the area information of the respective cases sets forth the priority among the respective areas. In this embodiment, the game device 1 sets forth the stereoscopic parameter according to one of the areas among the plurality of areas where the character 2 is positioned according to the priority when the character 2 is positioned simultaneously in a plurality of areas. The priority information is used in the foregoing case. Note that, for example, if the character 2 is not positioned simultaneously in a plurality of areas, for example, if the plurality of areas set in the game space do not overlap, the game device 1 does not need the priority information.

The game progress information 516 is information containing the game progress. The game progress information 516 includes, for example, the elapsed time of the game, score information, and so on. The game device 1 retains the foregoing information.

[Functional Block]

Figure 12:
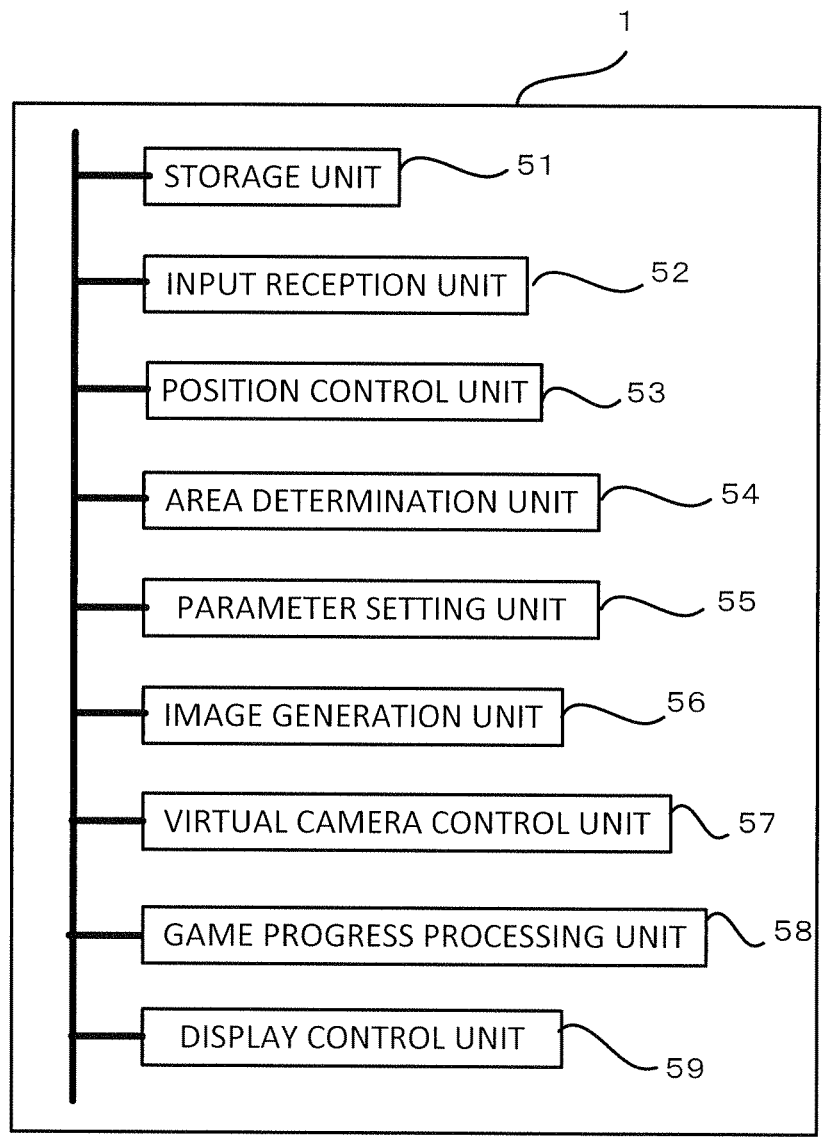
FIG. 12 is a block diagram illustrating the functions of the game device according to an embodiment of this invention.

FIG. 12 illustrates the functional block of the game device 1 according to this embodiment. The respective functional blocks shown in FIG. 12, for example, are a part of the functions that are realized by the information processing unit 31 (CPU 311 and GPU 312) reading and executing the game program stored in the external memory 45.

By executing the game program, the game device 1 operates as a storage unit 51, an input reception unit 52, a position control unit 53, an area determination unit 54, a para ere setting unit 55, an image generation unit 56, a virtual camera control unit 57, a game progress processing unit 58, and a display control unit 59.

The storage unit 51 retains, as described above, character information 511, obstacle information 512, field information 513, virtual camera information 514, area information 515, game progress information 516, and so on.

The input reception unit 52 receives the input via the input device that is connected to the game device 1. Specifically, the input reception unit 52 receives the input operation of the player via the various operation buttons 14A to 14I and the analog stick 15. For example, the input reception unit 52 receives the input operation via the cross-shaped button 14A or the analog stick 15 as the movement operation of the character 2 by the player. Moreover, for example, the input reception unit 52 receives the input operation via the operation buttons 14B to 14E as the action operation of the character 2 by the player. The action operation is an operation of causing the character 2 to perform predetermined operations such as flying.

The position control unit 53 controls the position of the object in the virtual space. Specifically, the position control unit 53 controls the position of the character 2. For example, the position control unit 53 controls the position of the character 2 based on the input operation via the cross-shaped button 14A or the analog stick 15 that was received by the input reception unit 52.

The area determination unit 54 determines the area where the character 2, which was controlled by the position control unit 53, is positioned among the plurality of areas set in the game space. Specifically, the area determination unit 54 determines the area where the character 2 is positioned by using the range information contained in the character information 511 and the area information 515 stored in the storage unit 51. The area where the character 2 is positioned is identified based on the foregoing determination. Note that the shape of the area set in the game space is a three-dimensional shape such as a cuboid, a circular cylinder, and a sphere.

The parameter setting unit 55 sets the stereoscopic parameter (virtual camera information 514) that is used for the rendering of the stereoscopic image according to the identified area based on the determination by the area determination unit 54. In this embodiment, foremost, the parameter setting unit 55 acquires, from the storage unit 51, the setup information contained in the area information (area information 515) of one case corresponding to the area that was identified based on the determination by the area determination unit 54. Subsequently, the value of the stereoscopic parameter is set based on the value that is shown in the rendering setup parameter contained in the acquired setup information.

Note that the parameter setting unit 55 can also the stereoscopic parameter so that the value set in the stereoscopic parameter gradually changes from the current value to the setting value when the setting value to be set in the stereoscopic parameter according to the identified area is different from the current value that is set in the stereoscopic parameter.

Moreover, in the foregoing gradual change, the parameter setting unit 55 can also set the stereoscopic parameter so that the variation of the change from the current value to the setting value becomes constant. The parameter setting unit 55 can also change the stereoscopic parameter so that the variation of the change from the current value to the setting value will decrease. The parameter setting unit 55 can also change the stereoscopic parameter so that the variation of the change from the current value to the setting value will increase.

The image generation unit 56 generates the stereoscopic image by rendering the stereoscopic image containing the character 2 based on the stereoscopic parameter (virtual camera information 514) that was set by the parameter setting unit 55. Since the rendering of the stereoscopic image is the same as the foregoing explanation, the explanation thereof is omitted.

Note that there are cases where the parameter setting unit 55 sets the stereoscopic parameter so that the value that is set in the stereoscopic parameter gradually changes from the current value to the setting value when the setting value to be set in the stereoscopic parameter according to the identified area is different from the current value that is set in the stereoscopic parameter. Here, the image generation unit 56 at least once renders the stereoscopic image based on the stereoscopic parameter during the change. Note that the period of the change or the number of times that rendering is performed during the change is set forth, for example, according to the area that was identified based on the determination by the area determination unit 54.

The virtual camera control unit 57 controls the status of the virtual camera such as the position and orientation by referring to and updating the information showing the position and orientation of the virtual camera contained in the virtual camera information 514. For example, the virtual camera control unit 57 controls the position and orientation of the virtual camera based on the position of the character 2 that is controlled by the position control unit 53 so that the character 2 is included in the filming target range of the two virtual cameras (C1, C2).

The game progress processing unit 58 manages the game progress of the action game according to this embodiment by referring to and updating the game progress information 516. For example, the game progress processing unit 58 manages the score that is obtained by the player operating the character 2, and managing the elapsed time in the game space according to the elapsed time of the real space acquired by the RTC 38.

The display control unit 59 displays the stereoscopic image that was generated by the image generation unit 56 on the upper LCD 22. In other words, the display control unit 59 controls the display of the image of the upper LCD 22. The upper LCD 22 displays the image three-dimensionally or two-dimensionally as a result of being controlled by the display control unit 59.

The game device 1 includes the foregoing functional blocks. Note that, in the ensuing explanation, when explaining the processing performed by the respective functions described above which are realized by the information processing unit 31, the respective functional blocks are explained as the subject of processing in substitute for the information processing unit 31.

§2 Operational Example

Figure 13:
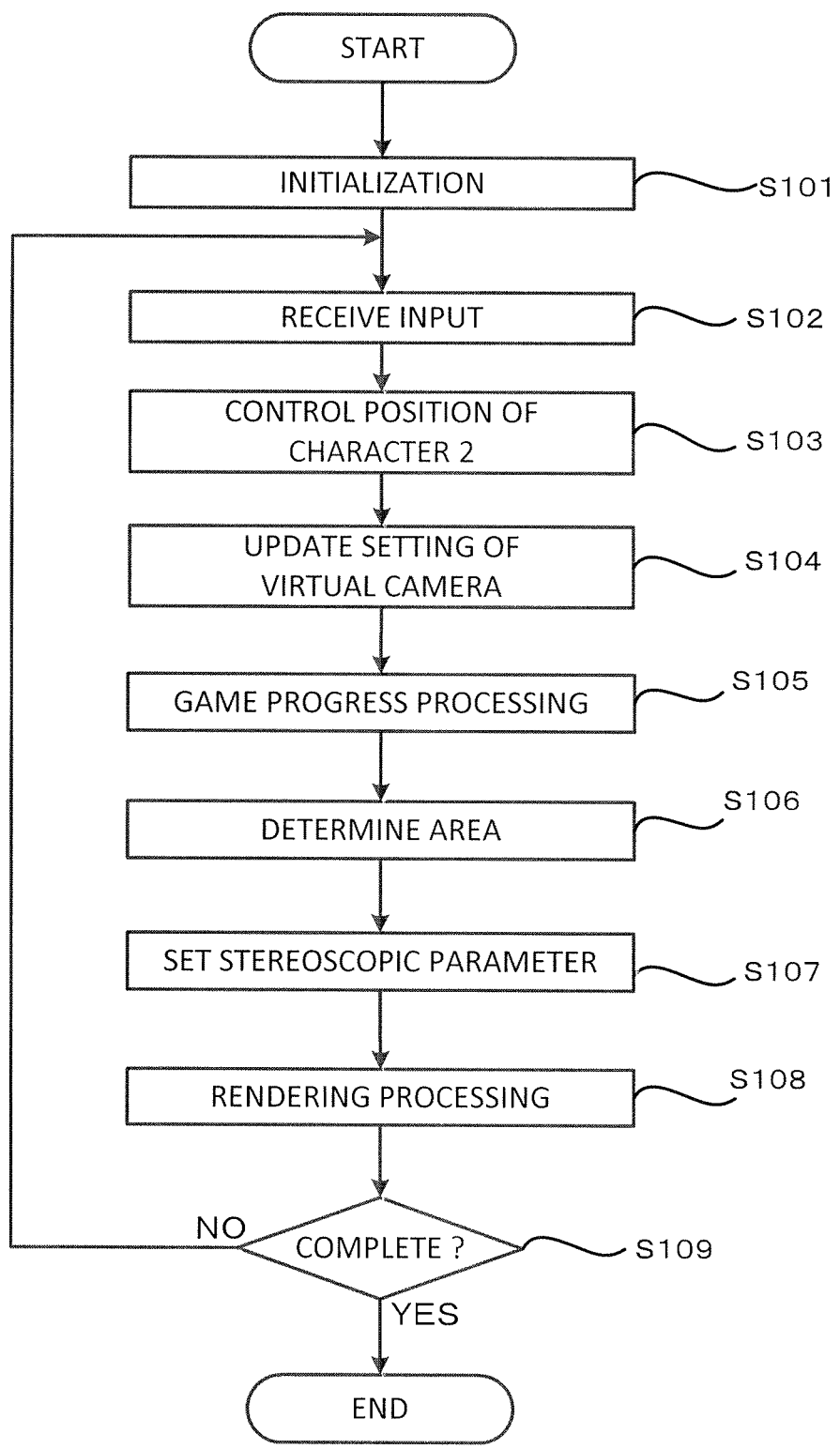
FIG. 13 is a flowchart illustrating the flow of the game processing according to an embodiment of this invention.

The flow of the game processing according to this embodiment is now explained with reference to FIG. 13. FIG. 13 is a flowchart showing the flow of the game processing according to this embodiment. Note that the term "step" in FIG. 13 is abbreviated as "S".

In step 101, initialization is performed. The information processing unit 31 sets, for example, the initial value to the parameter concerning the status of the character 2 contained in the character information 511 as the trigger of the action for starting the game, the parameter concerning the status of the obstacle contained in the obstacle information 512, various types of information concerning the setting of the virtual camera contained in the virtual camera information 514, and the game progress information. When the initialization ends, the processing proceeds to step 102.

In step 102, the input operation from the player is received via the input device. The input reception unit 52 receives the input operation via the various operation buttons 14A to 14I, and the analog stick 15. The processing thereafter proceeds to step 103.

In step 103, the position of the character 2 is controlled. Specifically, the position control unit 53 acquires the information (coordinates value and the like) concerning the position of the character 2 from the parameters concerning the status of the character 2 contained in the character information 511. Moreover, the position control unit 53 acquires information concerning the mobile speed of the character 2 contained in the character information 511, and information showing the position and orientation of the virtual camera contained in the virtual camera information 514. Subsequently, the position control unit 53 updates the information concerning the position of the character 2 based on the player's input operation that was received by the input reception unit 52, information concerning the mobile speed of the character 2 contained in the character information 511, and information showing the position and orientation of the virtual camera contained in the virtual camera information 514. The position control unit 53 identifies, for example, the position where the character 2, which moved based on the operation of the character 2 itself, should exist that can be identified from the player's input operation (movement operation) that was received in step 102 and information concerning the mobile speed of the character 2 with the position and orientation of the virtual camera as the reference. Here, for example, the position control unit 53 refers to the obstacle information 512 and the field information 513. In addition, the position control unit 53 identifies the position of the character 2 so that the character 2 does not get embedded in the field 3 (ground, wall and so on) and the obstacle 4. The position control unit 53 updates the information concerning the position of the character 2 contained in the character information 511 based on the identified position. The position control unit 53 can thereby control the position of the character 2. After the foregoing control, the processing proceeds to step 104. Note that the method of identifying the position of the character 2 is not limited to the foregoing identification method. The method of identifying the position of the character 2 is selected as needed.

In step 104, the setting of the virtual camera is updated. For example, the virtual camera control unit 57 acquires information showing the position and orientation of the virtual camera contained in the virtual camera information 514. Subsequently, the virtual camera control unit 57 identifies the position of the virtual camera to be updated based on the player's input operation that was received by the input reception unit 52, the position of the character 2, or the mobile speed of the character 2. The virtual camera control unit 57 updates the position of the virtual camera contained in the virtual camera information 514 based on the identified position. Moreover, the virtual camera control unit 57 updates the orientation of the virtual camera as with the position of the virtual camera. After the setting of the virtual camera is updated, the processing proceeds to step 105.

Note that, in step 104, for example, the virtual camera control unit 57 can also identify, as the position of the virtual camera, the position that is of a given height from the field 3 (for example, the ground), which is behind the character 2, and where the distance to the character 2 becomes constant. Moreover, for example, the virtual camera control unit 57 can also identify the position of the virtual camera so that the virtual camera is pulled by the character 2 and follows the movement of the character 2 when the distance between the virtual camera and the character 2 becomes a given level or higher according to the movement of the character 2. Moreover, for example, the virtual camera control unit 57 can also identify the position of the virtual camera so that the character 2 does not get embedded in the field 3 (ground, wall and so on) and the obstacle 4. Moreover, for example, the virtual camera control unit 57 can also identify the position of the virtual camera so that no object (for example, the obstacle 4) other than the character 2 does not enter between the virtual camera and the character 2. However, the method of identifying the position of the virtual camera is not limited to the foregoing methods. The method of identifying the position of the virtual camera can be selected as needed.

In step 105, the game progress processing is executed. The game progress processing unit 58 determines whether a predetermined event has occurred, for example, based on the input that was received by the input reception unit 52 via the input device, the character information 511, the obstacle information 512, and the field information 513. A predetermined event is, for example, the character 2 reaching the goal point provided on the field 3. If this kind of event has occurred, the game progress processing unit 58 updates, for example, the score information contained in the game progress information 516 of the storage unit 51. Moreover, the game progress processing unit 58 updates, for example, the game time according to the elapsed time of the real space. Then the game progress processing ends, the processing proceeds to step 106.

In step 106, the area where the character 2 is positioned is determined. For example, the area determination unit 54 acquires information concerning the position of the character 2 from the character information 511. Information concerning the position of the character 2 is the information that was updated in step 103. Moreover, the area determination unit 54 acquires the range information showing the range of the respective areas from the area information 515. Subsequently, the area determination unit 54 compares the position of the character 2 and the range of the respective areas, and determines the area of the range including the position of the character 2. The area where the character 2 is positioned is determined based on the foregoing determination. The processing thereafter proceeds to step 107.

In step 107, the stereoscopic parameter for rendering the stereoscopic image is set based on the area that was identified in step 106. Specifically, the parameter setting unit 55 acquires the area information corresponding to the area that was identified in step 106 from the area information 515. Subsequently, the parameter setting unit 55 sets the stereoscopic parameter by using the setup information (rendering setup parameter) contained in the acquired area information.

Figure 14:
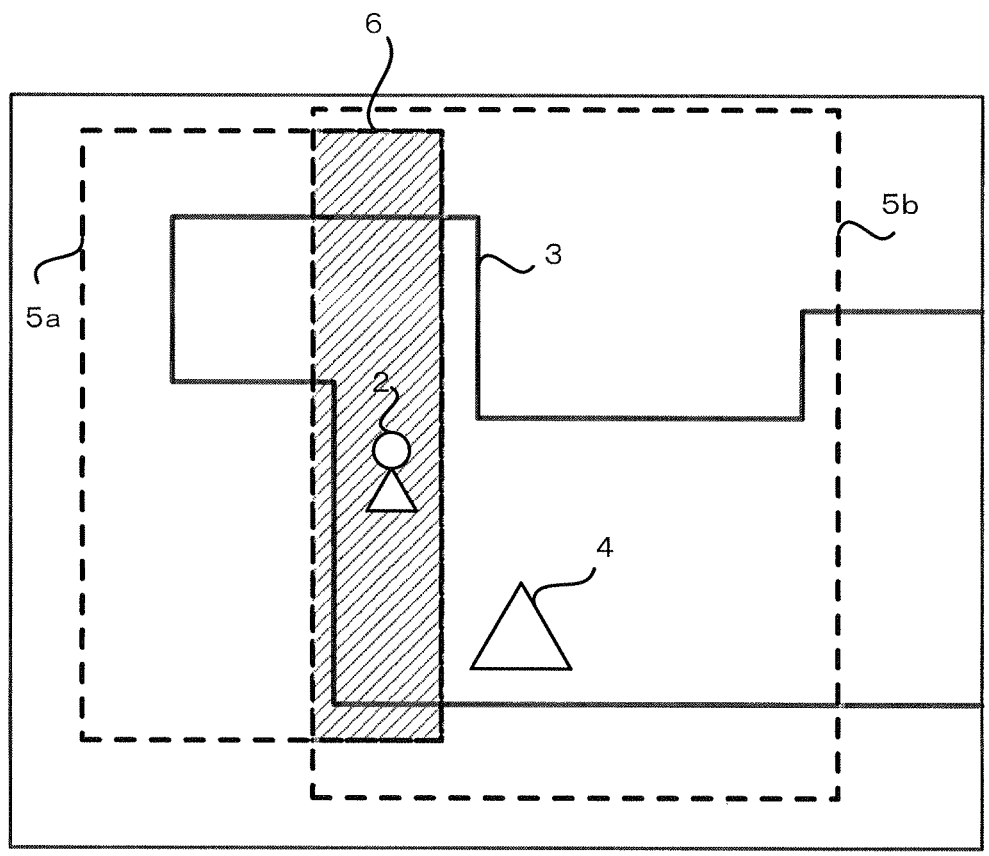
FIG. 14 is an overhead view illustrating the status where the object is simultaneously positioned in a plurality of areas in an embodiment of this invention.

Note that there are cases where the area that is identified in step 106 is a plurality of areas. In other words, there are cases where the character 2 is simultaneously positioned in a plurality of areas. FIG. 14 illustrates the status where the character 2 is simultaneously positioned in a plurality of areas. The area 6 (diagonal area) shown in FIG. 14 is the area where the area 5*a* and the area 5*b* set in the game space overlap. The character 2 is positioned in the area 6. In other words, the character 2 is simultaneously positioned in the area 5*a* and the area 5*b* which were set in the game space.

In the foregoing case, for example, the parameter setting unit 55 can also set the area for which the stereoscopic parameter should be set according to the priority that was set to the plurality of areas. Here, for example, the parameter setting unit 55 can set the area with the highest priority as the area for which the stereoscopic parameter should be set. However, the method of identifying the area for which the stereoscopic parameter should be set according to the priority is not limited to the foregoing method. For example, the area with the lowest priority can be identified as the area for which the stereoscopic parameter should be set.

Moreover, here, for example, the parameter setting unit 55 can refer to the priority information contained in the area information corresponding to each of the plurality of areas (for example, the area 5*a* and the area 5*b*) where the character 2 is simultaneously positioned, and, after identifying the area for which the stereoscopic parameter should be set, acquire the setup information to be used for setting the stereoscopic parameter. However, the method of acquiring the setup information is not limited to the foregoing method. For example, the parameter setting unit 55 can acquire the area information pertaining to each of the plurality of areas where the character 2 is simultaneously positioned, and compare the priority information contained in the acquired area information. In addition, the parameter setting unit 55 can set the area information corresponding to the area for which the stereoscopic parameter should be set based on the foregoing comparison, and acquire the setup information to be used for setting the stereoscopic parameter from the selected area information.

Moreover, in the foregoing case, for example, the parameter setting unit 55 can also identify the area for which the stereoscopic parameter should be set based on the movement of the character 2. For example, the parameter setting unit 55 can identify, as the area for which the stereoscopic parameter should be set, the area (for example, the area 5a) where the character 2 existed immediately before being simultaneously positioned in a plurality of areas among the plurality of areas (for example, the area 5a and the area 5b) where the character 2 is simultaneously positioned.

If the area identified in step 106 is a plurality of areas, the area for which the stereoscopic parameter should be set is identified in step 107. The parameter setting unit 55 sets the stereoscopic parameter by using the setup information contained in the area information corresponding to the identified area.

In step 107, the stereoscopic parameter for rendering the stereoscopic image is set as described above. The processing thereafter proceeds to step 108.

Returning to FIG. 13, in step 108, the rendering processing of the stereoscopic image is executed. The image generation unit 56 generates the stereoscopic image by using the stereoscopic parameter that was set by the parameter setting unit 55. For example, the image generation unit 56 renders the stereoscopic image and generates the stereoscopic image based on the character information 511, the obstacle information 512, the field information 513, and the virtual camera information 514.

Note that, after the stereoscopic image is generated by the image generation unit 56, the display control unit 59 outputs the stereoscopic image that was rendered by the image generation unit 56 to the upper LCD 22. The display control unit 59 displays the stereoscopic image on the upper LCD 22 in a state which enables stereoscopic viewing. The processing thereafter proceeds to subsequent step 109.

In step 109, the game progress processing unit 58 determines whether it is game end. For example, the game progress processing unit 58 determines the game end based on the occurrence of an event such as the lapse of a predetermined time. When the game end is determined by the game progress processing unit 58 (YES in step 109), the game processing according to this embodiment ends. Meanwhile, if the game progress processing unit 58 determines that it is not game end (NO in step 109), the game processing according to this embodiment returns to step 102 and is repeated.

According to this embodiment, the stereoscopic image containing the character 2 is generated by using the stereoscopic parameter that is set according to the plurality of areas set in the game space. For example, in accordance with the foregoing areas, the distance Df between the two virtual cameras (C1, C2) and the distance D between the respective virtual cameras (C1, C2) and the zero parallax plane PD0 are set. As described above, in this embodiment, it is possible to set the distance Df between the two virtual cameras (C1, C2) and the distance D between the respective virtual cameras (C1, C2) and the zero parallax plane PD0 according to the respective areas. Thus, according to this embodiment, it is possible to enable the user to more appropriately comprehend the virtual space that is represented with the stereoscopic image.

Moreover, according to this embodiment, the stereoscopic parameter that is used for rendering the stereoscopic image is set according to the plurality of areas set in the game space. Here, the stereoscopic parameter needs to be set according to the status of the game space in order to enable the player to appropriately comprehend the game space. Thus, the plurality of areas set in the game space are preferably set based on the status of the game space. In this embodiment, the shape that can be set as the shape of the plurality of areas set in the game space can be, for example, a plurality of types of shapes such as a cuboid, a circular cylinder, or a sphere. Let it be assumed that, for example, the shape of the plurality of areas set in the game space is suitably selected based on the status of the game space, and the case of this selection, a plurality of types of different shapes are selected. In other words, let it be assumed that areas of a plurality of types of different shape were set in the game space. Here, there may be a portion (overlapping area) where the areas overlap. In this overlapping area, there is a problem regarding how to set the stereoscopic parameter. In this embodiment, when the character 2 is positioned in this kind of overlapping area; that is, when the character 2 is simultaneously positioned in a plurality of areas, the area for which the stereoscopic parameter is set is identified based on the priority that is set in the respective areas. Thus, in this embodiment, the plurality of areas can be set in the game space without having to consider problems that will arise due to the existence of the foregoing overlapping area. In other words, in this embodiment, the plurality of areas can be set easily so as to be compatible with the status in the game space.

Note that the processing of step 102 to step 107 is repeated until the game ends. In this embodiment, the series of processing of step 102 to step 107 is considered the processing of one frame. Moreover, in this embodiment, the processing of 30 frames is performed in one second.

Figure 15:
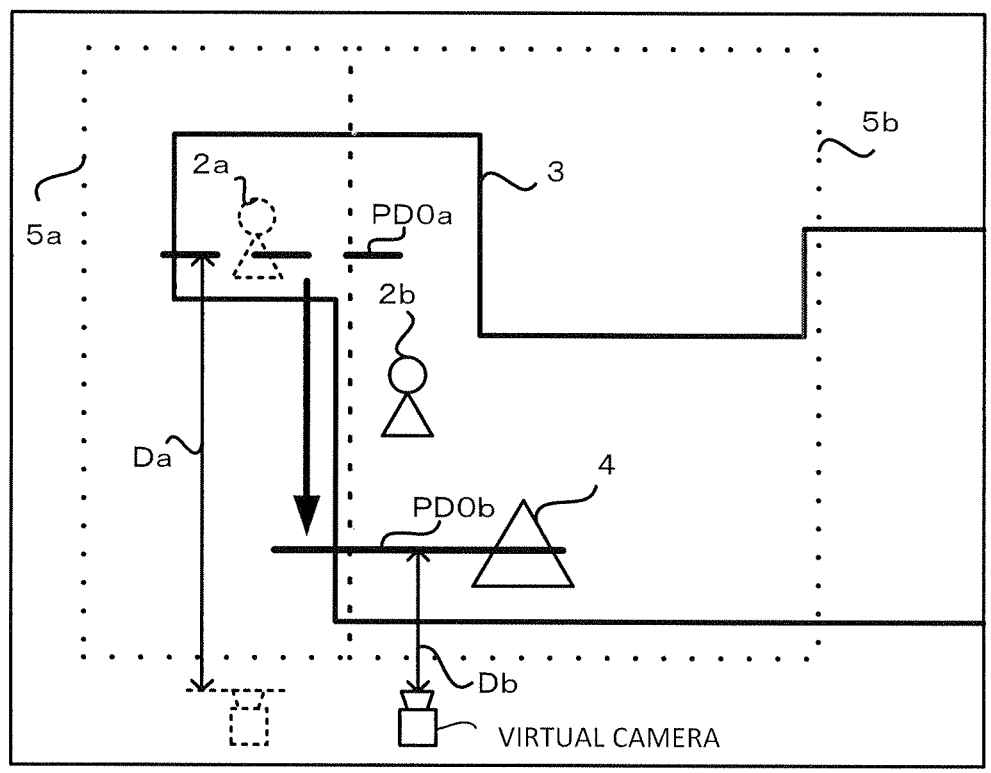
FIG. 15 is an overhead view illustrating the switching of the stereoscopic parameter in the case when the area where the object is positioned is switched in an embodiment of this invention.

When the step 102 to step 107 is repeated, the area where the character 2 is positioned that is identified in step 106 can be switched by the player operating the character 2. To put it differently, the area for which the stereoscopic parameter is set can be switched in step 107. Here, the value that is set in the stereoscopic parameter could become switched. FIG. 15 illustrates a state where the value set in the stereoscopic parameter has been switched. FIG. 15 illustrates a case when the character 2 moves from the position shown with the character 2a to the position shown with the character 2b. The zero parallax plane PD0a is the zero parallax plane that is set in the area 5a. Moreover, the zero parallax plane PD0b is the zero parallax plane that is set in the area 5b. In the example shown in FIG. 15, the distance Da between the virtual camera and the zero parallax plane PD0a is different from the distance Pb between the virtual camera and the zero parallax plane PD0b. In other words, for example, when the character 2 moves from the area 5a to the area 5b, a different value is set in the stereoscopic parameter (distance D).

Here, let it be assumed that the value of the stereoscopic parameter is switched during the processing of one frame. For example, let it be assumed that the value of the stereoscopic parameter is switched during the processing of the frame in step 107 at the time that the position of the character 2 changed from the area 5a to the area 5b. In the foregoing case, specifically, based on the processing of the parameter setting unit 55, the value that is set in the stereoscopic parameter is switched from the value (current value) that is set by the setup information acquired from the area information corresponding to the area 5a to the setting value to be set by the setup information acquired from the area information corresponding to the area 5b. Here, the greater the difference between the current value and the setting value, a stereoscopic image with a greater difference during one frame is rendered.

In this embodiment, in consideration of the foregoing point, the stereoscopic parameter is set in step 107 so that the value of the stereoscopic parameter gradually changes from the current value to the setting value across a plurality of frames. FIGS. 16A to 16E illustrate the change in the value set in the stereoscopic parameter during the foregoing operation. Note that FIGS. 16A to 16E are respectively graphs in which the time that the area identified by the area determination unit 54 in step 106 was switched is "t=0".

Figure 16A:
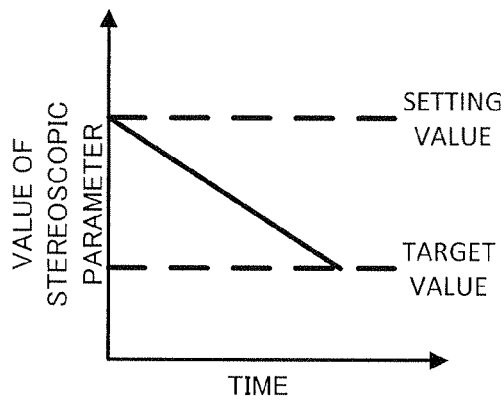
FIG. 16A is a diagram illustrating the change of the value that is set in the stereoscopic parameter according to an embodiment of this invention.
Figure 16B:
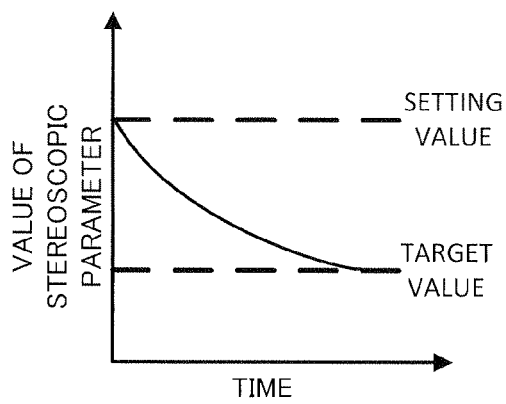
FIG. 16B is a diagram illustrating the change of the value that is set in the stereoscopic parameter according to an embodiment of this invention.
Figure 16C:
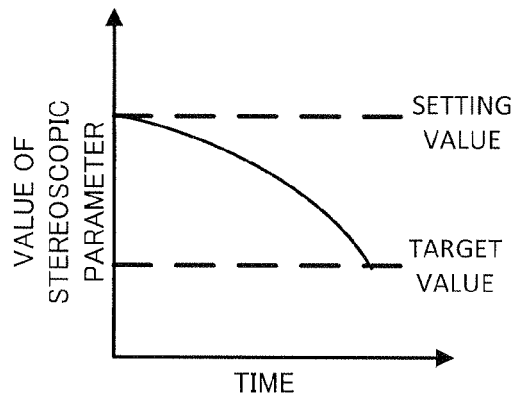
FIG. 16C is a diagram illustrating the change of the value that is set in the stereoscopic parameter according to an embodiment of this invention.

FIG. 16A illustrates a case where the variation in the change from the current value to the setting value is constant. FIG. 16B illustrates a case where the stereoscopic parameter is set for that the variation of the change from the current value to the setting value decreases. FIG. 16C illustrates a case where the stereoscopic parameter is set for that the variation of the change from the current value to the setting value increases. Note that the variation of the change from the current value to the setting value is not limited to the variation illustrated in FIGS. 16A to 16C.

Figure 16D:
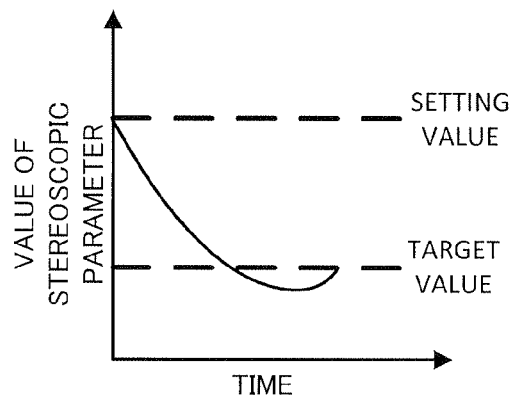
FIG. 16D is a diagram illustrating the change of the value that is set in the stereoscopic parameter according to an embodiment of this invention.
Figure 16E:
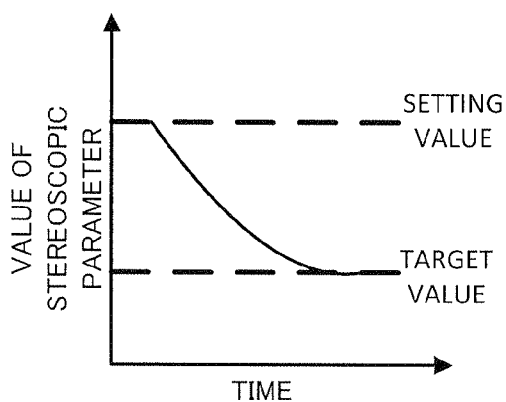
FIG. 16E is a diagram illustrating the change of the value that is set in the stereoscopic parameter according to an embodiment of this invention.

Moreover, FIG. 16D illustrates a case where a value other than a value between the current value and the setting value is set in the stereoscopic parameter during the change from the current value to the setting value. Moreover, FIG. 16E illustrates a case where the value of the stereoscopic parameter changes from the current value to the setting value from the time that is temporally shifted from the time that the position of the character 2 switched from the area 5a to the area 5b. As shown in FIG. 16D, a value other than a value between the current value and the setting value can also be set in the stereoscopic parameter during the foregoing change. Moreover, as shown in FIG. 16E, the value of the stereoscopic parameter can also change from the current value to the setting value from the time that is temporally shifted from the time that the position of the character 2 switched from the area 5a to the area 5b. Moreover, FIGS. 16D and 16E illustrate cases of applying, to the change illustrated in FIG. 16B, the specification of setting a value other than a value between the current value and the setting value in the stereoscopic parameter, and the specification of changing from the current value to the setting value from the time that is temporally shifted from the time that the position of the character 2 switched from the area 5a to the area 5b. Nevertheless, the specification of setting a value other than a value between the current value and the setting value in the stereoscopic parameter, and the specification of changing from the current value to the setting value from the time that is temporally shifted from the time that the position of the character 2 switched from the area 5a to the area 5b can also be applied to any kind of change. For example, these specifications can also be applied to the changes illustrated in FIG. 16A or 16C.

In this embodiment, the parameter setting unit 55 sets the value of the stereoscopic parameter as described above. Consequently, the game device 1 in this embodiment reduces the difference in the stereoscopic image during one frame. Consequently, in this embodiment, it is possible to prevent the abrupt change in the stereoscopic image during one frame.

Moreover, in this embodiment, the parameter setting unit 55 sets the stereoscopic parameter so that the value of the stereoscopic parameter changes from the current value to the setting value from the time that is temporally shifted from the time that the position of the character 2 switched from the area 5a to the area 5b. Consequently, in this embodiment, for example, when the position of the character 2 frequently switches areas as a result of the character 2 going back and forth between the area 5a and the area 5b, it is possible to prevent the value that is set in the stereoscopic parameter from being switched frequently. Thus, in this embodiment, it is possible to prevent the frequent and abrupt change of the stereoscopic image that is rendered based on the stereoscopic parameter that may occur when the area where the character 2 is positioned is switched frequently.

Note that the number of frames pertaining to the change in the value of the stereoscopic parameter can be designated based on the time that is pertaining to the change. When the number of frames is to be designated based on the time, the value obtained by dividing the time pertaining to the change by the time required for one frame becomes the number of frames pertaining to the change (number of times that steps 102 to 107 is repeated).

Moreover, the number of frames pertaining to the change in the value of the stereoscopic parameter can also be decided according to the area set in the game space where the character 2 is positioned. For example, if the character 2 moves from the area 5a to the area 5b, the number of frames pertaining to the change in the value of the stereoscopic parameter can also be decided according to the area 5a or the area 5b. Consequently, the number of frames pertaining to the change in the value of the stereoscopic parameter can be set as needed. For example, the number of frames pertaining to the change in the value of the stereoscopic parameter can also be set forth so that it is proportional to the variation upon switching the stereoscopic parameter. Consequently, the stereoscopic parameter can be set so that the value set in the stereoscopic parameter changes the same way among all areas.

Note that the foregoing embodiment is merely one embodiment of the present invention, and does not limit the scope of the present invention in any way.

Moreover, in the foregoing embodiment, one information processing device (game device body) is executing a plurality of processes. Nevertheless, there is no limitation in the number of information processing devices that can be used to perform the processing, and a plurality of information processing devices (for example, the game device body and a server device) can share and execute the plurality of processes.

Moreover, for example, the program (game program) can also be supplied from an arbitrary computer-readable storage medium (for example, an optical disk, a semiconductor memory or the like) to the game device body. In addition, for example, the game program can be supplied by being preliminarily stored in the nonvolatile memory (ROM/RTC 13, flash memory 17) inside the game device body. Furthermore, for example, the game program can be supplied by being sent from another information processing device (game device or server device) to the game device body. The method of supplying the program (game program) to the information processing device (game device body) does not limit the present invention.

It is an aspect of the embodiment of the present invention to enable the user to more appropriately comprehend the virtual space that is represented using stereoscopic images.

According to the embodiment of the present invention, it is possible to enable the user to more appropriately comprehend the virtual space that is represented by the stereoscopic image.

What is claimed is:

1. A non-transitory computer-readable medium storing an information processing program to be executed by a computer of an information processing device which displays a predetermined virtual space on a display device capable of stereoscopic display, the information processing program, when executed by the computer, causes the information processing device to perform operations, comprising:

controlling a position of an object in the virtual space, wherein the object is movable between or among a plurality of predetermined areas set in the virtual space, each of which set areas has a three-dimensional shape;

setting a priority value to be associated to each of the plurality of three-dimensional shape predetermined areas set in the virtual space;

determining where the object is to be positioned among the plurality of three-dimensional shape predetermined areas set in the virtual space;

setting a value for a stereoscopic parameter to be used for rendering a stereoscopic image, the value being based upon a particular three-dimensional shape area where the object is determined to be positioned, wherein if it is determined that the object is simultaneously positioned in a plurality of said three-dimensional areas, the value for the stereoscopic parameter is set in accordance with the priority of each area from among the plurality of predetermined areas where the object is simultaneously positioned;

generating a stereoscopic image including the object, based on the value set for the stereoscopic parameter; and displaying the generated stereoscopic image on the display device.

2. The non-transitory computer-readable medium storing the information processing program according to claim 1, the information processing program further causing the computer of the information processing device to receive an input from an input device, wherein the position of the object is controlled based on a received input.

3. The non-transitory computer-readable medium storing the information processing program according to claim 1, wherein the plurality of predetermined areas comprise a plurality of types of shapes.

4. The non-transitory computer-readable medium storing the information processing program according to claim 1, wherein the plurality of types of shapes include three-dimensional shapes including at least a cuboid, a circular cylinder or a sphere.

5. The non-transitory computer-readable medium storing the information processing program according to claim 1, wherein the stereoscopic parameter includes at least a parameter concerning a reference plane which prescribes in the virtual space a position where parallax does not occur or a parameter concerning a sense of depth of the stereoscopic image.

6. The non-transitory computer-readable medium storing the information processing program according to claim 1, wherein when a setting value, which is a value to be set as the stereoscopic parameter according to the determined area, is different from a current value that is already being used as a stereoscopic parameter, the stereoscopic parameter is set to a value that gradually changes from the current value to the setting value.

7. The non-transitory computer-readable medium storing the information processing program according to claim 6, wherein the stereoscopic parameter is set such that the value that is set as the stereoscopic parameter gradually changes from the current value to the setting value after a lapse of an initial predetermined period.

8. The non-transitory computer-readable medium storing the information processing program according to claim 6, wherein the stereoscopic parameter is set so that a variation pertaining to the change from the current value to the setting value becomes constant in the setting the stereoscopic parameter.

9. The non-transitory computer-readable medium storing the information processing program according to claim 6, wherein the stereoscopic parameter is set so that a variation pertaining to the change from the current value to the setting value decreases in the setting the stereoscopic parameter.

10. The non-transitory computer-readable medium storing the information processing program according to claim 6, wherein the stereoscopic parameter is set so that a variation pertaining to the change from the current value to the setting value increases in the setting the stereoscopic parameter.

11. The non-transitory computer-readable medium storing the information processing program according to claim 6, wherein the period of change from the current value to the setting value is prescribed according to the determined area.

12. An information processing device which displays a predetermined virtual space on a display device capable of stereoscopic display, the information processing device including one or more processing units configured to perform functions and operate as:

a position control unit configured to control a position of an object in the virtual space, wherein the object is movable between or among a plurality of predetermined areas set in the virtual space, each of which set areas has a three-dimensional shape;

an area priority setting unit configured to set a priority value to be associated to each of the plurality of three-dimensional shape predetermined areas set in the virtual space;

an area determination unit configured to determine where the object is to be positioned among the plurality of three-dimensional shape predetermined areas set in the virtual space;

a parameter setting unit configured to set a value for a stereoscopic parameter to be used for rendering a stereoscopic image, the value being based upon a particular three-dimensional shape area where the object is determined to be positioned, wherein if it is determined that the object is simultaneously positioned in a plurality of said three-dimensional areas, the value for the stereoscopic parameter is set in accordance with the priority of each area from among the plurality of predetermined areas where the object is simultaneously positioned;

an image generation unit configured to generate a stereoscopic image including the object, based on the value set for the stereoscopic parameter; and a display control unit configured to display the stereoscopic image generated by the image generation unit on the display device.

13. An information processing system which displays a predetermined virtual space on a display device capable of stereoscopic display, the information processing system, comprising:

position control unit to control a position of an object in the virtual space, wherein the object is movable between or among a plurality of predetermined areas set in the virtual space, each of which set areas has a three-dimensional shape;

an area priority setting unit to set a priority value to be associated to each of the plurality of three-dimensional shape predetermined areas set in the virtual space;

area determination unit to determine where the object is to be positioned among the plurality of three-dimensional shape predetermined areas set in the virtual space;

parameter setting unit to set a stereoscopic parameter which is used for rendering a stereoscopic image, the parameter set based upon a particular three-dimensional shape area where the object is determined to be positioned, wherein if it is determined that the object is simultaneously positioned in a plurality of said three-dimensional areas, the value for the stereoscopic parameter is set in accordance with the priority of each area from among the plurality of predetermined areas where the object is simultaneously positioned;

image generation unit to generate a stereoscopic image including the object, based on the stereoscopic parameter set by the parameter setting unit; and display control unit to display the stereoscopic image generated by the image generation unit on the display device.

14. An information processing method to be performed by an information processing device having one or more processing units and which displays a predetermined virtual space on a display device capable of stereoscopic display, the method comprising:

controlling a position of an object in the virtual space, wherein the object is movable between or among a plurality of predetermined areas set in the virtual space, each of which set areas has a three-dimensional shape;

setting a priority value to be associated to each of the plurality of three-dimensional shape predetermined areas set in the virtual space;

determining where the object is to be positioned among the plurality of three-dimensional shape predetermined areas set in the virtual space;

using said one or more processing units for setting a stereoscopic parameter which is used for rendering a stereoscopic image based upon a particular three-dimensional shape area where the object is determined to be positioned, wherein if it is determined that the object is simultaneously positioned in a plurality of said three-dimensional areas, the value for the stereoscopic parameter is set in accordance with the priority of each area from among the plurality of predetermined areas where the object is simultaneously positioned;

generating a stereoscopic image including the object, based on the set stereoscopic parameter; and displaying the generated stereoscopic image on the display device.

* * * * *